United States Patent
Liu

(10) Patent No.: US 12,271,412 B2
(45) Date of Patent: Apr. 8, 2025

(54) METHODS, SYSTEMS, AND MEDIA FOR MODIFYING THE PRESENTATION OF CONTEXTUALLY RELEVANT DOCUMENTS IN BROWSER WINDOWS OF A BROWSING APPLICATION

(71) Applicant: GOOGLE LLC, Mountain View, CA (US)

(72) Inventor: Eric HC Liu, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/535,761

(22) Filed: Dec. 11, 2023

(65) Prior Publication Data
US 2024/0104126 A1    Mar. 28, 2024

Related U.S. Application Data

(63) Continuation of application No. 17/980,030, filed on Nov. 3, 2022, now Pat. No. 11,841,887, which is a
(Continued)

(51) Int. Cl.
*G06F 17/00* (2019.01)
*G06F 16/335* (2019.01)
(Continued)

(52) U.S. Cl.
CPC .......... *G06F 16/335* (2019.01); *G06F 40/134* (2020.01); *G06F 40/14* (2020.01); *G06Q 10/107* (2013.01); *G06Q 50/01* (2013.01); *H04J 3/0623* (2013.01); *H04J 3/167* (2013.01); *H04L 51/08* (2013.01); *H04J 2203/0085* (2013.01)

(58) Field of Classification Search
CPC ...... G06F 16/335; G06F 40/134; G06F 40/14; G06Q 10/107; G06Q 50/01; H04J 3/0623; H04J 3/167; H04J 2203/0085; H04L 51/08
See application file for complete search history.

(56) References Cited

U.S. PATENT DOCUMENTS 6,591,198 B1   7/2003   Pratt
6,647,410 B1   11/2003  Scimone et al.
(Continued)

FOREIGN PATENT DOCUMENTS

CN   101981570 A   2/2011
CN   102622404 A   8/2012
(Continued)

*Primary Examiner* — Laurie A Ries
(74) *Attorney, Agent, or Firm* — Brake Hughes Bellermann LLP

(57) ABSTRACT

Methods, systems, and media for presenting contextually relevant information are provided. In some implementations, the method includes: receiving information associated with a user of a user device from multiple data sources, where the user device comprises a display; identifying, without user intervention, a relevant document based on the received information associated with the user of the user device; determining that a new browser window or a new browser tab has been opened by a browser application being executed by the user device; and causing, without user intervention, the relevant document to be presented using the new browser window or new browser tab.

20 Claims, 14 Drawing Sheets

Related U.S. Application Data continuation of application No. 17/360,279, filed on Jun. 28, 2021, now Pat. No. 11,494,426, which is a continuation of application No. 14/619,843, filed on Feb. 11, 2015, now Pat. No. 11,048,855.

(51) Int. Cl.

| | |
|---|---|
| G06F 40/134 | (2020.01) |
| G06F 40/14 | (2020.01) |
| G06Q 10/107 | (2023.01) |
| G06Q 50/00 | (2012.01) |
| H04J 3/06 | (2006.01) |
| H04J 3/16 | (2006.01) |
| H04L 51/08 | (2022.01) |

(56) References Cited

U.S. PATENT DOCUMENTS

| | | | |
|---|---|---|---|
| 6,680,675 B1 | 1/2004 | Suzuki | |
| 8,154,418 B2 | 4/2012 | Peterson et al. | |
| 8,533,266 B2 | 9/2013 | Koulomzin et al. | |
| 8,619,157 B2 | 12/2013 | Holmes | |
| 8,732,613 B2* | 5/2014 | Li | G06F 3/0483 |
| | | | 715/833 |
| 8,798,596 B2 | 8/2014 | Shuster et al. | |
| 8,799,277 B2 | 8/2014 | Park et al. | |
| 8,812,258 B2 | 8/2014 | Nadkarni et al. | |
| 8,824,751 B2 | 9/2014 | Wise | |
| 8,897,505 B2 | 11/2014 | Gokturk et al. | |
| 9,046,919 B2 | 6/2015 | Niknejad | |
| 9,055,276 B2 | 6/2015 | Parulski | |
| 9,086,798 B2 | 7/2015 | Barrus et al. | |
| 9,274,913 B2* | 3/2016 | Kay | G06F 11/30 |
| 9,275,079 B2 | 3/2016 | Nalawadi et al. | |
| 9,300,706 B1 | 3/2016 | Wise | |
| 9,529,487 B1* | 12/2016 | Bottner | G06F 3/0483 |
| 9,535,499 B2 | 1/2017 | Lee et al. | |
| 9,910,865 B2 | 3/2018 | Mikolajczyk et al. | |
| 9,953,514 B2 | 4/2018 | Fadell et al. | |
| 9,977,828 B2 | 5/2018 | Garg et al. | |
| 9,984,349 B2 | 5/2018 | Skaaksrud | |
| 9,996,631 B2* | 6/2018 | Kleinhout | G06F 16/9574 |
| 10,068,060 B2 | 9/2018 | Madan et al. | |
| 10,338,783 B2* | 7/2019 | Barrus | G06F 3/0482 |
| 11,277,652 B2* | 3/2022 | Saretto | H04W 4/21 |
| 11,507,732 B1* | 11/2022 | Duran | G06F 40/106 |
| 2001/0019657 A1 | 9/2001 | Mcgrath et al. | |
| 2005/0246637 A1 | 11/2005 | Knight et al. | |
| 2007/0100666 A1 | 5/2007 | Stivoric et al. | |
| 2007/0130145 A1 | 6/2007 | Pedersen et al. | |
| 2007/0168514 A1 | 7/2007 | Cocotis et al. | |
| 2007/0247431 A1 | 10/2007 | Skillman et al. | |
| 2008/0038702 A1 | 2/2008 | Choquet | |
| 2008/0091515 A1 | 4/2008 | Thieberger et al. | |
| 2008/0097979 A1 | 4/2008 | Heidloff et al. | |
| 2008/0183824 A1 | 7/2008 | Chen et al. | |
| 2009/0002178 A1 | 1/2009 | Guday et al. | |
| 2009/0002939 A1 | 1/2009 | Baugh et al. | |
| 2009/0058819 A1 | 3/2009 | Gioscia et al. | |
| 2009/0089241 A1 | 4/2009 | Zelinsky et al. | |
| 2009/0092262 A1 | 4/2009 | Costa et al. | |
| 2009/0265165 A1 | 10/2009 | Apelqvist et al. | |
| 2009/0265330 A1 | 10/2009 | Cheng et al. | |
| 2009/0287995 A1 | 11/2009 | Tsao | |
| 2009/0292526 A1 | 11/2009 | Harari et al. | |
| 2009/0319938 A1 | 12/2009 | Vaughan et al. | |
| 2010/0153175 A1 | 6/2010 | Wohlert et al. | |
| 2010/0169756 A1* | 7/2010 | Bonchi | G06F 16/9562 |
| | | | 715/206 |
| 2010/0241663 A1 | 9/2010 | Huang et al. | |
| 2011/0021898 A1 | 1/2011 | Wei et al. | |
| 2011/0125063 A1 | 5/2011 | Shalon et al. | |
| 2011/0126123 A1 | 5/2011 | Reter et al. | |
| 2011/0231770 A1 | 9/2011 | Tovar | |
| 2011/0276396 A1 | 11/2011 | Rathod et al. | |
| 2011/0279359 A1 | 11/2011 | Mccarty | |
| 2011/0289433 A1* | 11/2011 | Whalin | H04L 51/52 |
| | | | 715/753 |
| 2011/0299235 A1 | 12/2011 | Liu et al. | |
| 2012/0239761 A1 | 9/2012 | Linner et al. | |
| 2012/0258437 A1 | 10/2012 | Sadeh-Koniecpol et al. | |
| 2012/0314917 A1 | 12/2012 | Kiyohara et al. | |
| 2012/0316455 A1 | 12/2012 | Rahman et al. | |
| 2013/0027571 A1 | 1/2013 | Parulski | |
| 2013/0036117 A1 | 2/2013 | Fisher et al. | |
| 2013/0052946 A1 | 2/2013 | Chatterjee et al. | |
| 2013/0089243 A1 | 4/2013 | Sauve et al. | |
| 2013/0111514 A1 | 5/2013 | Slavin et al. | |
| 2013/0111531 A1 | 5/2013 | Kawai et al. | |
| 2013/0147597 A1 | 6/2013 | Omar et al. | |
| 2013/0166076 A1 | 6/2013 | Karr | |
| 2013/0169680 A1 | 7/2013 | Chien et al. | |
| 2013/0198260 A1 | 8/2013 | Dow et al. | |
| 2013/0212176 A1 | 8/2013 | Koulomzin et al. | |
| 2013/0325858 A1 | 12/2013 | Xu | |
| 2014/0025620 A1 | 1/2014 | Greenzeiger et al. | |
| 2014/0040010 A1 | 2/2014 | Garcia-Martinez | |
| 2014/0052282 A1 | 2/2014 | Balassanian | |
| 2014/0067130 A1 | 3/2014 | Pillai et al. | |
| 2014/0089243 A1 | 3/2014 | Oppenheimer | |
| 2014/0089431 A1 | 3/2014 | Filev et al. | |
| 2014/0126706 A1 | 5/2014 | Barbulescu et al. | |
| 2014/0146970 A1 | 5/2014 | Kim et al. | |
| 2014/0156566 A1 | 6/2014 | Kabiljo et al. | |
| 2014/0180744 A1 | 6/2014 | Kozloski et al. | |
| 2014/0207460 A1 | 7/2014 | Jiang et al. | |
| 2014/0207811 A1 | 7/2014 | Kim et al. | |
| 2014/0223462 A1 | 8/2014 | Aimone et al. | |
| 2014/0244617 A1 | 8/2014 | Rose | |
| 2014/0280529 A1 | 9/2014 | Davis et al. | |
| 2014/0298364 A1 | 10/2014 | Stepanov et al. | |
| 2014/0334653 A1 | 11/2014 | Luna et al. | |
| 2014/0350349 A1 | 11/2014 | Geurts et al. | |
| 2014/0353049 A1 | 12/2014 | Vidal et al. | |
| 2014/0371909 A1 | 12/2014 | Lee et al. | |
| 2015/0006298 A1 | 1/2015 | Ross et al. | |
| 2015/0019714 A1 | 1/2015 | Shaashua et al. | |
| 2015/0019983 A1* | 1/2015 | White | G06Q 30/02 |
| | | | 715/739 |
| 2015/0026260 A1* | 1/2015 | Worthley | G06F 16/958 |
| | | | 709/204 |
| 2015/0039621 A1 | 2/2015 | Mikolajczyk et al. | |
| 2015/0081695 A1 | 3/2015 | Schillings et al. | |
| 2015/0105608 A1 | 4/2015 | Lipoma et al. | |
| 2015/0109104 A1 | 4/2015 | Veron et al. | |
| 2015/0109112 A1 | 4/2015 | Fadell et al. | |
| 2015/0112885 A1 | 4/2015 | Fadell et al. | |
| 2015/0116107 A1 | 4/2015 | Fadell et al. | |
| 2015/0116108 A1 | 4/2015 | Fadell et al. | |
| 2015/0116109 A1 | 4/2015 | Fadell et al. | |
| 2015/0136862 A1 | 5/2015 | Wolf | |
| 2015/0149390 A1 | 5/2015 | Brdiczka et al. | |
| 2015/0278330 A1 | 10/2015 | Hawa et al. | |
| 2015/0296594 A1 | 10/2015 | Blum et al. | |
| 2015/0324698 A1 | 11/2015 | Karaoguz et al. | |
| 2015/0356121 A1 | 12/2015 | Schmelzer | |
| 2015/0370993 A1 | 12/2015 | Moturu et al. | |
| 2016/0063532 A1 | 3/2016 | Loeb et al. | |
| 2016/0063874 A1 | 3/2016 | Czerwinski et al. | |
| 2016/0083073 A1 | 3/2016 | Beckman | |
| 2016/0085802 A1 | 3/2016 | Rios et al. | |
| 2016/0110524 A1 | 4/2016 | Short et al. | |
| 2016/0123743 A1 | 5/2016 | Sisbot et al. | |
| 2016/0179833 A1 | 6/2016 | Lin | |
| 2016/0179943 A1 | 6/2016 | Ku et al. | |
| 2016/0179962 A1 | 6/2016 | Patten et al. | |
| 2017/0154176 A1 | 6/2017 | Yun et al. | |
| 2017/0172494 A1 | 6/2017 | Warren et al. | |
| 2017/0238859 A1 | 8/2017 | Sadowsky et al. | |
| 2017/0372271 A1 | 12/2017 | Goldsmith et al. | |

(56) References Cited

U.S. PATENT DOCUMENTS

2020/0336778 A1 10/2020 Saretto et al.
2020/0349610 A1 11/2020 Publicover et al.

FOREIGN PATENT DOCUMENTS

| | | | |
|---|---|---|---|
| CN | 103052954 | A | 4/2013 |
| CN | 103574837 | A | 2/2014 |
| CN | 103595858 | A | 2/2014 |
| CN | 203465576 | U | 3/2014 |
| CN | 103941853 | A | 7/2014 |
| CN | 103974657 | A | 8/2014 |
| CN | 104182449 | A | 12/2014 |
| CN | 102907019 | B | 7/2015 |
| CN | 103984692 | B | 5/2021 |
| GB | 2503546 | A | 1/2014 |
| JP | 2006254285 | A | 9/2006 |
| JP | 2006282111 | A | 10/2006 |
| JP | 2013110736 | A | 6/2013 |
| JP | 2018512607 | A | 5/2018 |
| KR | 20140011204 | A | 1/2014 |
| WO | 0150387 | A1 | 7/2001 |
| WO | 2011001002 | A1 | 1/2011 |
| WO | 2013088307 | A1 | 6/2013 |
| WO | 2014005868 | A1 | 1/2014 |
| WO | 2014022157 | A1 | 2/2014 |
| WO | 2014071165 | A1 | 5/2014 |
| WO | 2014159297 | A1 | 10/2014 |
| WO | WO-2015150886 A1 * | | 10/2015 ....... G06F 17/30867 |

\* cited by examiner

METHODS, SYSTEMS, AND MEDIA FOR MODIFYING THE PRESENTATION OF CONTEXTUALLY RELEVANT DOCUMENTS IN BROWSER WINDOWS OF A BROWSING APPLICATION

CROSS-REFERENCE TO RELATED APPLICATIONS

This application is a continuation of U.S. patent application Ser. No. 17/980,030, filed Nov. 3, 2022, which is a continuation of U.S. patent application Ser. No. 17/360,279, filed Jun. 28, 2021, which is a continuation of U.S. patent application Ser. No. 14/619,843, filed Feb. 11, 2015, each of which is hereby incorporated by reference herein in its entirety.

This application is related to U.S. patent application Ser. No. 14/619,827, entitled "METHODS, SYSTEMS, AND MEDIA FOR AMBIENT BACKGROUND NOISE MODIFICATION BASED ON MOOD AND/OR BEHAVIOR INFORMATION," U.S. patent application Ser. No. 14/9619,866, entitled "METHODS, SYSTEMS, AND MEDIA FOR PRODUCING SENSORY OUTPUTS CORRELATED WITH RELEVANT INFORMATION," U.S. patent application Ser. No. 14/619,894, entitled "METHODS, SYSTEMS, AND MEDIA FOR PRESENTING INFORMATION RELATED TO AN EVENT BASED ON METADATA," U.S. patent application Ser. No. 14/619,821, entitled "METHODS, SYSTEMS, AND MEDIA FOR RECOMMENDING COMPUTERIZED SERVICES BASED ON AN ANIMATE OBJECT IN THE USER'S ENVIRONMENT," and U.S. patent application Ser. No. 14/619,863, entitled "METHODS, SYSTEMS, AND MEDIA FOR PERSONALIZING COMPUTERIZED SERVICES BASED ON MOOD AND/OR BEHAVIOR INFORMATION FROM MULTIPLE DATA SOURCES," all of which were filed on Feb. 11, 2015, and incorporated by reference herein in their entireties.

TECHNICAL FIELD

The disclosed subject matter relates to methods, systems, and media for presenting contextually relevant information.

BACKGROUND

Many millions of documents such as web pages, emails, attachments to emails, images sent to a user, etc., are available to users of devices such as personal computers, mobile phones and tablet computers. However, to find a particular document, the user often must sift through many documents that are not the document that the user is currently interested in.

Accordingly, it is desirable to provide methods, systems, and media for presenting contextually relevant information.

SUMMARY

In accordance with some implementations of the disclosed subject matter, methods, systems, and media for presenting contextually relevant information are provided.

In accordance with some implementations of the disclosed subject matter, a method for presenting contextually relevant information is provided, the method comprising: receiving, using a hardware processor, information associated with a user of a user device from a plurality of data sources, wherein the user device comprises a display; identifying, without user intervention, a relevant document based on the received information associated with the user of the user device; determining that a new browser window or a new browser tab has been opened by a browser application being executed by the user device; and causing, without user intervention, the relevant document to be presented using the new browser window or new browser tab.

In accordance with some implementations of the disclosed subject matter, a system for presenting contextually relevant information is provided, the system comprising: a hardware processor that is programmed to: receive information associated with a user of a user device from a plurality of data sources, wherein the user device comprises a display; identify, without user intervention, a relevant document based on the received information associated with the user of the user device; determine that a new browser window or a new browser tab has been opened by a browser application being executed by the user device; and cause, without user intervention, the relevant document to be presented using the new browser window or new browser tab.

In accordance with some implementations of the disclosed subject matter, a non-transitory computer-readable medium containing computer executable instructions that, when executed by a processor, cause the processor to perform a method for presenting contextually relevant information is provided, the method comprising: receiving information associated with a user of a user device from a plurality of data sources, wherein the user device comprises a display; identifying, without user intervention, a relevant document based on the received information associated with the user of the user device; determining that a new browser window or a new browser tab has been opened by a browser application being executed by the user device; and causing, without user intervention, the relevant document to be presented using the new browser window or new browser tab.

In accordance with some implementations of the disclosed subject matter, a system for presenting contextually relevant information is provided, the system comprising: means for receiving information associated with a user of a user device from a plurality of data sources, wherein the user device comprises a display; means for identifying, without user intervention, a relevant document based on the received information associated with the user of the user device; means for determining that a new browser window or a new browser tab has been opened by a browser application being executed by the user device; and means for causing, without user intervention, the relevant document to be presented using the new browser window or new browser tab.

In some implementations, the relevant document is a web page.

In some implementations, the plurality of data sources includes metadata of a plurality of messages viewed using a messaging account associated with the user.

In some implementations, the relevant document is a document attached to at least one of the messages, and wherein the relevant document is identified based on metadata indicating that the relevant document was attached to the at least one of the messages.

In some implementations, the relevant document is identified based on timing information related to how recently the relevant document was attached to the message.

In some implementations, the relevant document is identified based on a number of messages in a thread of messages that includes the at least one message to which the relevant document was attached being equal to or greater than a threshold number of messages.

In some implementations, attachment to a message is indicated by a link to the relevant document being included in the message.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
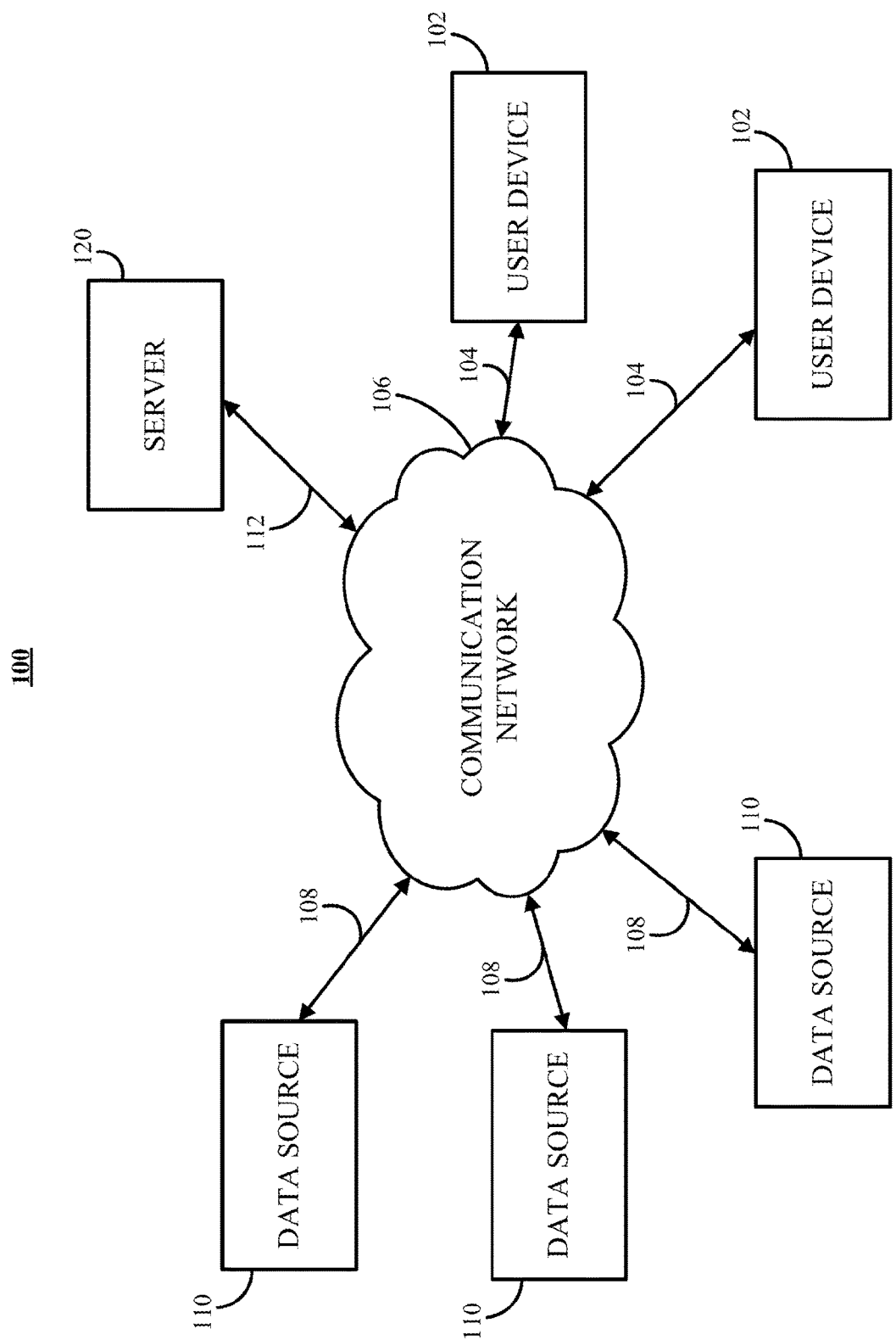
FIG. 1 shows an example of a generalized schematic diagram of a system on which the mechanisms for personalizing computerized services based on mood and/or behavior information from multiple data sources in accordance with some implementations of the disclosed subject matter.

In accordance with some implementations, as described in more detail below, mechanisms, which can include methods, systems, and/or computer readable media, for personalizing computerized services based on mood and/or behavior information from multiple data sources are provided.

Generally speaking, these mechanisms can receive inputs from a user of a user device relating to a particular objective for that user and, based on received data that relates to the user, can provide personalized and computerized services that may assist the user in reaching that particular objective. For example, the user of the user device may indicate via a user interface a desire to incorporate more exercise during the course of a workday and, based on data relating to the user from one or more data sources for which the user has affirmatively given consent, the mechanisms can recommend one or more actions that may technologically assist the user in reaching the particular objective—e.g., by recommending through an automatic mobile alert or notification that the user walk to the office today based on weather information, scheduling constraints based on an online calendar, and/or traffic and public transportation information received through one or more computer networks; by recommending that the user who has a particular interest in flowers visit a gardening vendor along the user's route as identified by a computer map routing service (e.g., Google Maps); etc.

It should be noted that, additionally or alternatively to receiving an input relating to a particular objective, the mechanisms can receive user feedback and, based on the received user feedback, determine goals for the user. For example, the user may indicate a lack of energy on weekdays via a user interface on the user device and the mechanisms can interpret such an indication and determine various goals for the user, such as increasing the amount of exercise-related activities. In another example, the user can be provided with an interface that requests the user provides feedback as to the user's general mood, emotional state, and/or behavioral disposition and the mechanisms can determine goals for the user based on the provided feedback. Illustrative examples of goals that can be determined for a user and/or associated with a user device can include reducing stress from a currently indicated stress level, generally losing weight, losing ten pounds, attaining a particular mood or emotional state (e.g., relaxed, lively, etc.), increasing the amount of exercise that the user currently achieves, making more friends, and/or any other suitable goal relating to the user's general mood, emotional state, and/or behavioral disposition.

It should also be noted that, prior to analyzing data relating to the user from multiple data sources, determining a mood, emotional state, and/or behavioral disposition associated with the user, and/or recommending one or more actions to the user, the mechanisms can request (or require) that the user affirmatively provide consent or authorization to perform such determinations. For example, upon loading an application on a mobile device, the application can prompt the user to provide authorization for receiving information from one or more data sources, performing such determinations, and/or recommending one or more actions to the user. In a more particular example, in response to downloading the application and loading the application on the mobile device, the application executing on the mobile device can perform device discovery functions to determine devices that are connected to or nearby the mobile device, such as a media playback device that includes media data (e.g., watch history, recorded media content information, etc.) and/or a scent generator that includes an activity and/or light sensor for obtaining information relating to the environment around the connected mobile device. The application can then present the user with an interface that requests (or requires) that the user affirmatively provide consent to accessing information from these devices by selecting the one or more devices or data sources for receiving information relating to the user that can be used to determine a mood, emotional state, and/or behavioral disposition associated with the user, determine one or more goals or objectives associated with the user, and/or recommend one or more actions that may impact the physical state, emotional state, and/or behavioral disposition associated with the user. Additionally or alternatively, in response to installing the application on the mobile device, the user can be prompted with a permission message that requests (or requires) that the user affirmatively provide consent prior to receiving information from one or more data sources, performing such determinations, and/or recommending one or more actions to the user.

Upon receiving consent and/or authorization, the mechanisms can receive any suitable data relating to the user from multiple data sources. Such data can include contextual data, social data, personal data, etc. For example, the mechanisms can predict a current mood state for the user based on content and/or information published by the user on a social networking service (e.g., using a social networking application on the user device), biometric data associated with the user (e.g., from a wearable computing device associated with a user account), location data associated with the user (e.g., from the user device), and/or any other suitable data indicative of current mood and/or behavior of the user. In another example, the mechanisms can determine particular activities that the user has engaged in, such as attending a social event (e.g., a conference, a party, a sports event, etc. from an online calendar), consuming a media content item (e.g., a video clip, a song, a news article, a webpage, etc.), interacting with a computing device (e.g., a mobile phone, a wearable computing device, a tablet computer, etc.), interacting with an application (e.g., a media playback application, a social networking application, a messaging application, a web browser, etc. on a user device), and/or any other suitable activity. This activity data can, for example, be used to determine reference behaviors associated with the user (e.g., a particular time and portion of the day is typically spent watching videos on a media playback application executing on a mobile device).

In some implementations, based on data relating to the user that is received from one or more data sources for which the user has affirmatively provided consent, the mechanisms can recommend one or more computerized actions that may assist the user in reaching one or more of the objectives and/or goals. For example, the mechanisms can use device discovery functions to determine which output devices for executing the one or more recommended actions are connected to the mobile device or are proximate to the mobile device, such as devices having a speaker that are capable of playing audio content, devices having a display that are capable of presenting video content, lighting systems that are capable of providing a particular lighting scheme, and scent generators that are capable of emitting a particular scent. In response, these mechanisms can transmit instructions to an output device that is capable of executing a recommended action. For example, in response to determining information indicative of the user's general mood, emotional state, and/or behavioral disposition from one or more data sources, the mechanisms can identify one or more activities that, if performed, may move the user towards a particular objective or goal. In this example, the mechanisms can transmit a message or other suitable interface indicating the recommended activities to the mobile device associated with the user.

In a more particular example, in response to receiving social networking data from a social media application that indicates the user may be experiencing low energy levels (e.g., analyzing text from a post using the social media application) and online calendar data that includes scheduling information associated with a user for a given day, the mechanisms can recommend one or more computerized actions to the user that may assist the user in reaching one or more of the determined goals. The mechanisms can review a route to an event listed in the calendar data, where the route has been identified by a computer map routing service, and transmit an interface to be presented on the mobile device associated with the user, where the interface recommends that the user walk to the event and visit a particular juice vendor along the route as identified by a computer map routing service.

Additionally or alternatively to a recommendation interface that includes a message or other suitable content, personalized and computerized services can include a determination that a particular atmosphere should be created that may affect the user's general mood, emotional state, and/or behavioral disposition. In one particular example, the atmosphere can include causing particular content to be automatically played back (e.g., a particular song that is designated as being inspirational to users), causing a news feed of articles that are designated as positive stories to be presented, causing photographs or other image content that are designated as amusing to users to be presented, and sound effects that are designated as having a relaxing effect on users, to be presented to the user on an associated user device (e.g., mobile device, television device, etc.). In another particular example, the atmosphere can be created by accessing a lighting system associated with the user or user device and causing particular light sources to switch on or off, select the level of light emitted from particular lighting devices, and/or select the color temperature of particular light sources, thereby modifying the lighting scheme in the user's surroundings. In yet another example, the atmosphere can be created by modifying an ambient noise emitted by a device connected to the user device (e.g., modifying the speed of a fan on a computing device associated with the user), emitting a particular scent from a device connected to the user device (e.g., causing a device that is capable of emitting particular scents and that is within a particular proximity of the user of the user device to emit a lavender scent), controlling an appliance or a home automation device connected to the user device (e.g., controlling the compressor of an HVAC unit or modifying the speed of the drum of a washer), etc.

In some implementations, the mechanisms can generate one or more profiles associated with a user device. For example, in some implementations, the mechanisms can generate various profiles that can be used to determine recommended actions suitable for the user of the user device. For example, the mechanisms can generate a profile that is indicative of the user's current mood, emotional state, and/or behavioral disposition and compare the generated profile with a target profile to determine a recommended action that, if performed, may move the user towards an objective or goal. In a more particular example, the target profile can be generated based on profiles or other actions of users that have indicated the achievement of a particular objective or goal (e.g., users that deem themselves to be highly successful, users that have lost five pounds in the past 30 days, etc.). In this example, the mechanisms can determine actions that are performed by users of user devices determined to have achieved a particular objective or goal and can determine whether one or more of these actions can be recommended to the user so that the user also achieves the particular objective or goal.

These and other features are further described in connection with FIGS. 1-16.

Turning to FIG. 1, FIG. 1 shows an example 100 of a generalized schematic diagram of a system on which the mechanisms for personalizing computerized services based on mood and/or behavior information from multiple data sources can be implemented in accordance with some implementations of the disclosed subject matter. As illustrated, system 100 can include one or more user devices 102. User devices 102 can be local to each other or remote from each other. User devices 102 can be connected by one or more communications links 104 to a communication network 106 that can, in turn, be linked to a server 120 via a communications link 112.

System 100 can include one or more data sources 110. Data source 110 can be any suitable device that can gather and/or provide data relating to a user or a user device.

For example, data source 110 can include any suitable sensor that can gather and/or provide data relating to a user, such as an image sensor (e.g., a camera, a video recorder, etc.), an audio sensor (e.g., a microphone, a sound lever meter, etc.), a radio-frequency identification (RFID) sensor, a Global Positioning System (GPS), a sensor that is capable of measuring one or more biological parameters (e.g., a heart rate, a respiration rate, a blood pressure, a body temperature, skin moisture, etc.), a wearable pedometer, a Wi-Fi router, etc. In a more particular example, data source 110 can be multiple sensors connected to a home automation system registered to a user account associated with the user, where different data streams relating to the environment in the user's home can be received. In another more particular example, data source 110 can include multiple sensors connected to a coffee shop that is local to the user and an application program interface that allows the recommendation system to request data relating to the local coffee shop (e.g., how many patrons are currently in the shop based on a door sensor, how many patrons are currently waiting in line to order in the shop based on an image sensor, whether a group that the user is assigned is likely to visit the shop by comparing a target profile with a customer profile associated with the shop, etc.).

In another example, data source 110 can include a computing device, such as a desktop, a laptop, a mobile phone, a tablet computer, a wearable computing device, etc. Examples of data provided by such a computing device can include user generated data (e.g., text inputs, photos, touch inputs, etc.), user application generated data (e.g., data provided by a browser application, data provided by a social networking application, a messaging application, a photo sharing application, a video sharing application, a media player application, etc.), data generated by one or more sensors resident on the computing device (e.g., an image sensor, a GPS, a sensor that is capable of measuring one or more biological parameters, etc.), and/or any other suitable data relating to the user. For example, data source 110 can include a computing device that has been registered to a user having a user account and data can include data from various applications installed on the computing device and registered using the same user account. In this example, the user of the computing device can select which applications or which data types (e.g., location data, wireless network data, etc.) is used by an application executing on user device 102 or server 120.

In yet another example, data source 110 can include one or more services that can provide data related to the user and/or a group of users (who may be similar to the user or dissimilar from the user). Such services can include, for example, a web search service, a social networking service, a messaging service, a video sharing service, a photo sharing service, a file hosting service, etc. In such an example, user device 102 or server 120 can communicate with data source 110 via one or more application programming interfaces and/or any other suitable data exchange mechanisms.

It should be noted that data from one or more data sources 110 can be used to determine the impact of a recommended action on a user's physical or emotional state. The emotional state of a user can be a complex phenomenon. Emotion can be a mental state that is associated with physiological activity and can be influenced by internal or external environmental conditions. Emotion can be associated with personality, mood, temperament, disposition, and motivation of a user. For example, emotional states can include happiness, contentment, tranquility, surprise, anger, fear, sadness, depression, disgust, tired, anxious, hurried, etc. In some examples, emotional states can be broadly classified into positive and negative emotions, where positive emotions can include happiness and contentment and negative emotions can include anger and depression. In addition, an example of an internal environmental condition includes an old memory and an example of external stimulus includes stress or the relief of stress due to various environmental factors.

It should also be noted that the physical or emotional state of a user can be considered an overall snapshot or view of the user's physical characteristics or emotions at a point in time. Because multiple factors can be involved in a user's physical or emotional state, the physical or emotional state can fluctuate even over short periods of time. By using data relating to the user from multiple sources, a user's physical or emotional state can be predicted, which can be used to determine whether to recommend a particular action at a given time. Moreover, changes to a user's physical or emotional state can be predicted based on new or updated data relating to the user from multiple sources. Even further, changes to a user's physical or emotional state can be used to evaluate whether recommended actions to devices possessed by, or located proximate to, the user may be moving the user towards a goal or objective.

Data sources 110 can be local to each other or remote from each other. Each data source 110 can be connected by one or more communications links 108 to communication network 106 that can, in turn, be linked to server 120 via communications link 112 and/or user device 102 via communications link 104.

It should be noted that, in some implementations, prior to accessing information from various data sources 110, user device 102 can request (or require) that the user of user device 102 provide authorization to access each of the various data sources 110. In some implementations, user device 102 can detect data sources 110 that are available to provide data relating to the user and can provide a user interface that allows the user of user device 102 to select which data sources 110 are to be used for obtaining data relating to the user.

Figure 2:
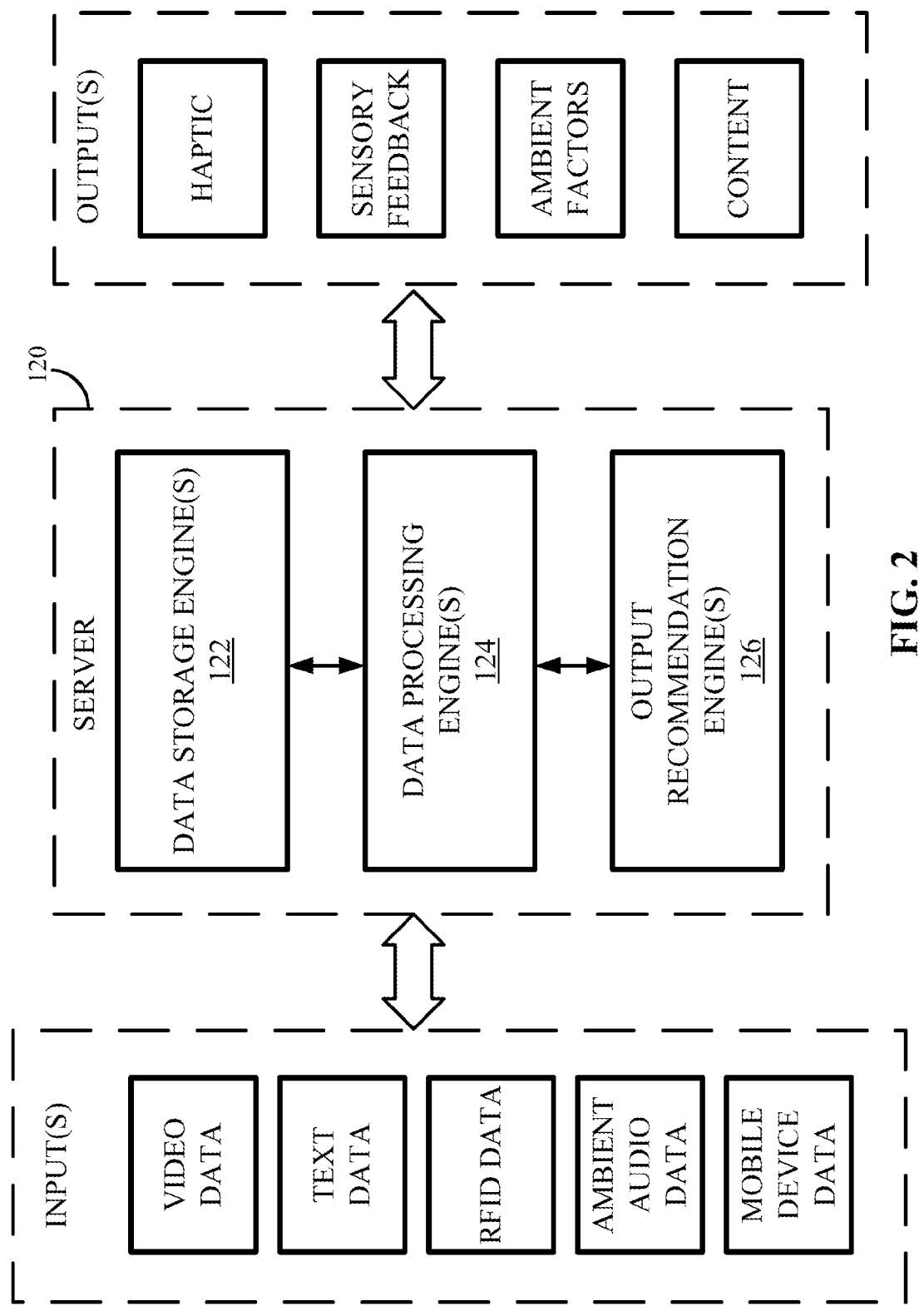
FIG. 2 shows a more particular example of a server of FIG. 1 that can receive various types of data from multiple data sources and that can recommend various types of actions based on a portion of the received data to various user devices associated with a user device in accordance with some implementations of the disclosed subject matter.

FIG. 2 shows an illustrative example of types of input data that can be received by user device 102 and/or server 120. As shown in FIG. 2, server 120 can include a data storage engine 122 for requesting, consolidating, storing, and/or processing data relating to a user or a group of users and a data processing engine 124 for categorizing received data (e.g., contextual data, social data, general data, etc.), selecting particular portions of data that may be indicative of a physical or emotional state of the user, and processing the selected portions of data. For example, as also shown in FIG. 2, server 120 can receive, among other things, various types of video data, text data, RFID data, ambient audio data (or keywords extracted from ambient audio data), and mobile device data.

Using one or more data sources 110, data storage engine 122 can receive any suitable data. For example, from one or more data sources 110, data storage engine 112 can receive and/or request data relating to activities engaged in by one or more users, such as "took a walk" and the distance traversed, visited a location that corresponds with a coffee shop, attended a social event (e.g., a conference, a party, a sporting event, etc.), attended a fitness training session, etc. As another example, from one or more data sources 110, data storage engine 112 can receive and/or request data that includes timing information related to an activity, such as a duration of the activity, a time corresponding to the activity, etc. As yet another example, data storage engine 112 can receive and/or request data that includes a number of occurrences of an activity engaged in by one or more users during a given time period (e.g., a day of the week, a couple of days, weekdays, weekends, etc.), a number of users that engage in a given activity, and/or any other suitable information relating to frequency information related to a given activity.

Using one or more data sources 110 that include social data sources, data storage engine 122 can receive and/or request data relating to content and/or information published by the user on a social networking service. For example, the data can include one or more mood states published by a user on a service (e.g., a social networking service, a messaging service, a video sharing service, a photo sharing service, an electronic commerce service, etc.). As another example, the data can include comments, messages, posts, locations, and/or any other suitable content published by the user on a social networking service. As still another example, the data can include any suitable information relating to one or more social connections of the user on a social networking service, content posted by the social connections, locations associated with the social connections, etc.

Using one or more data sources 110, data storage engine 112 can receive and/or request data relating to user interactions with one or more media content items. For example, the data can include any suitable information relating to a media content item with which the user has interacted. In a more particular example, the data can include a type of the media content item, a description of the media content item, a link to the media content item (e.g., a URL), an identifier that can identify the media content item (e.g., a URI, a program identifier, etc.), an author of the media content item, an artist related to the media content item, etc. As another example, the data can include any suitable information about a type of a user interaction with a media content item, such as consuming the media content item, publishing the media content item via a social networking service or any other suitable service, sharing the media content item with other users, liking the media content item via a social networking service or any other suitable service, commenting on the media content item, etc. As yet another example, the data can include any suitable timing information related to a user interaction with a media content item, such as a duration of the user interaction, a time corresponding to the user interaction, etc.

Using one or more data sources 110, data storage engine 112 can receive and/or request biometric data associated with the user. For example, in response to receiving authorization to access biometric data from data source 110 that includes a sensor, the biometric data can include any suitable physiological parameter associated with the user, such as a heart rate, a respiration rate, a blood pressure, a body temperature, skin moisture, etc. As another example, the biometric data can include a range of physiological parameters, such as a heart rate range, a blood pressure range, etc.

Using one or more data sources 110, data storage engine 112 can receive and/or request location data associated with the user. For example, in response to receiving authorization to access location information, the location data can include any suitable information that can be used to estimate a location of a computing device associated with the user, such as an identifier associated with the computing device (e.g., an IP address, GPS signals generated by the computing device, Wi-Fi access points associated with the computing device, information about a cell tower to which the computing device is connected, etc. As another example, the location data can include any suitable information that can be used to estimate a location of the user, such as a location published by the user using a suitable service (e.g., a social networking service), a location that a user intends to visit (e.g., a location associated with a social event scheduled using a calendar application executing on a mobile device, a social network account associated with the user, etc.), etc.

In some implementations, data storage engine 112 can categorize and/or classify data received from data sources 110.

For example, data storage engine 122 can receive data from multiple data sources 110 (e.g., using one or more application programming interfaces) and data processing engine 124 can classify the received data as general data when the received data includes information about one or more services used by a user (e.g., a social networking service, an email service, a messaging service, a video sharing service, etc.), search history associated with a user (e.g., keywords inputted by the user), etc.

As another example, data storage engine 122 can receive data from multiple data sources 110 (e.g., using one or more application programming interfaces) and data processing engine 124 can classify the received data as contextual data when the received data includes information about a location of user device 102, traffic information, weather information based on location information from user device 102 (e.g., "sunny," "cold," etc.), population density information within a given location, a location context relating to data provided by a data source 110 (e.g., "work," "home," "vacation," etc.), and/or any other suitable information that can provide contextual information related to the user.

As yet another example, data storage engine 122 can receive data from multiple data sources 110 (e.g., using one or more application programming interfaces) and data processing engine 124 can classify the received data as social data when the received data stream includes information related to social events involving multiple users (e.g., a conference scheduled using a social networking service, a calendar application, etc.), content and/or information published by one or more users using a service (e.g., a social networking service, a video sharing service, a photo sharing service, etc.), information about one or more social connections of a user, and/or any other suitable information that can be classified as social data. In a more particular example, social data associated with a user account of a social service can be retrieved in response to determining that the user account is also authenticated on user device 102.

As still another example, data storage engine 122 can receive data from multiple data sources 110 (e.g., using one or more application programming interfaces) and data processing engine 124 can classify the received data as personal data when the received data stream includes information about user goals, personal interests of a user (e.g., a user's stated interest available on a social networking service, media content consumed and/or liked by a user, etc.), one or more utterances generated by a user, and/or any other suitable information that can be regarded as personal. In this example, data processing engine 124 can discard personal data unless specific authorization to use such personal data is received from the user of user device 102.

In some implementations, data processing engine 124 can process data streams that are provided by data source 110 and/or that are stored and/or processed by data storage engine 122.

In some implementations, data processing engine 124 can determine whether data or a particular portion of data from data source 110 is relevant to a goal or objective of the user. It should be noted that, in some implementations, data processing engine 124 can determine whether data or a particular portion of data from multiple data sources 110 is relevant to a goal or objective of users assigned to a particular group of users.

In some implementations, data processing engine 124 can determine whether data or a particular portion of data from data source 110 is indicative of the emotional state of the user. These determinations can be made in any suitable manner. For example, the determination can be made using a suitable classifier that can classify input data or a portion of input data as being relevant to a goal or as being irrelevant to the goal.

In a more particular example, data processing engine 124 can select one or more portions of data, where each portion of data can correspond to any suitable period of time, such as a few minutes, a couple of hours, a day of the week, a couple of days, a week, a month, etc. In some implementations, the portions of data can be identified in any suitable manner. For example, a determination can be made using a classifier that can classify a portion of data as being relevant to a goal. In another example, a determination can be made using a classifier that can classify a portion of data as likely to be indicative of a user's emotional state. In yet another example, a determination can be made using a classifier that can classify a portion of data as being relevant to a recommended action (e.g., data that can be used to determine the likelihood that the action may impact the user's emotional state, data that can be used to determine when the recommended action is to be executed, etc.). It should be noted that the classifier can be trained using any suitable machine learning algorithm, such as a support vector machine, a decision tree, a Bayesian model, etc.

In some implementations, upon selecting various portions of data from multiple data sources 110, data processing engine 124 can assign a weight to each of the portions of data. For example, for a particular goal or objective, data processing engine 124 can determine that social data from particular data sources 110 is to be weighted such that it has more influence on the determination of the recommended action or output. This may be because social data that relates to the user and that is indicative of the user's emotional state is considered highly relevant to the objective of making new friends. In another example, this may be because social data tends to provide an accurate indication of the user's emotional state (e.g., as the user of the user devices frequently posts status updates on multiple social networking websites) and because, prior to recommending a particular action, such as driving a vehicle to a particular location, data processing engine 124 may take into account such social data. In another suitable example, weights can be set by the user of user device 102 such that the user can tune the application and how particular types of data relating to the user are processed. In a more particular example, the user can set weights associated with social data such that the effect of social data in the determination of an action or output is reduced.

In some implementations, data processing engine 124 can generate one or more profiles relating to the user. For example, data processing engine 124 can use the received data to generate a baseline profile that is used to assign the user of user device 102 to a group (e.g., a group of similar users for the particular objective or goal). In this example, data processing engine 124 can also generate a target profile for the individual user and/or the group of users, which can include data corresponding to similar users that have indicated an achievement of the particular objective or goal. Alternatively, data processing engine 124 can generate a target profile that includes data corresponding to similar users that have indicated a failure to attain the particular objective or goal. As another example, data processing engine 124 can use the received data and, in some implementations, request and receive updated data to generate a current profile associated with the user that is indicative of the user's current physical or emotional state.

Any suitable profile relating to the user of user device 102 or a group of users can be generated using any suitable approach. For example, data processing engine 124 can generate one or more profiles that are indicative of the user's physical or emotional state over a given time period. For example, a baseline profile associated with a user can be generated based on data that is determined to be indicative of the user's physical or emotional state during a given time period, such as mornings, a given day, weekdays, weekends, a given week, a season, and/or any other suitable time period. In another example, data processing engine 124 can generate one or more profiles that are indicative of the user's physical or emotional state for a given context, such as a typical work day, a vacation day, mood and/or behavior when user device 102 is located in the proximity of the user's home, mood and/or behavior when user device 102 indicates that the temperature in the proximity of user device 102 is below 65 degrees, etc.

In some implementations, server 120 can include an output recommendation engine 126 for determining and/or providing a recommended action that may affect or impact the physical or emotional state of the user. For example, in response to comparing a current profile corresponding to the user with a target profile, output recommendation engine 126 can determine a recommended action for the user. In a more particular example, output recommendation engine 126 can, based on comparing the current profile indicating that the user has a particular objective and a target profile of similar users that includes information relating to users where it has been determined that they have achieved the particular objective and information relating to users where it has been determined that they have not achieved the particular objective, determine one or more recommended actions that can impact the physical or emotional state of the user and, upon performing the recommended action, may assist the user in reaching the particular objective.

It should be noted that, in some implementations, output recommendation engine 126 can cause any suitable recommended action to be executed on user device 102 or any other suitable computing device associated with the user. As shown in FIG. 2, the action or output can include, among other things, a haptic or touch sensitive feedback, a sensory feedback (e.g., image content, light cues, music, video messages, video content, opening one or more relevant documents, etc.), an ambient-related feedback (e.g., causing a scent to be emitted from a suitable device, modifying a lighting scheme by a lighting or home automation system, etc.), and/or a content-related action (e.g., presenting text, image content, video content, audio content).

For example, output recommendation engine 126 can determine that a message is to be presented to user device 102 associated with the user to prompt the user to engage in an activity. This may, for example, assist the user in reaching a particular objective or goal. In a more particular example, output recommendation engine 126 can determine that the message is to be presented in a particular form (e.g., by email, text message, mobile notification, account notification, a user interface, and/or in any other suitable manner) and/or at a particular time (e.g., based on the current physical or emotional state of the user).

As another example, output recommendation engine 126 can determine that an atmosphere is to be created in the proximity of the user. This may, for example, assist the user in reaching a particular objective or goal and/or affect the determined emotional state of the user. In a more particular example, based on a determination of the user's current physical or emotional state, output recommendation engine 126 can cause music content, a feed of news articles that have been designated as being positive content, and/or a feed of image content that have been designed as being amusing content to be presented on user device 102 associated with the user. In another more particular example, output recommendation engine 126 can cause a sound effect (e.g., rain sounds) to be presented on a device having an audio output device that is connected to the user device, can cause ambient light in the user's surroundings to be adjusted using a lighting system connected to the user device, and/or can cause a scent to be emitted by actuating a scent generator in a proximity of the user using user device 102.

As yet another example, output recommendation engine 126 can identify one or more documents that are related to a particular task, activity and/or common subject matter. In some implementations, relevant documents can be automatically presented to the user and/or documents that are currently being presented can be arranged for presentation based on output recommendation engine 126 identifying the documents as being related to the particular task, activity and/or common subject matter. These and other examples are discussed in more detail below in connection with FIGS. 12-16.

Referring to FIG. 1, any suitable user device 102 can be used to execute a recommended action from output recommendation engine 126. For example, user device 102 can be a wearable computing device, a television, a monitor, a liquid crystal display, a three-dimensional display, a touchscreen, a simulated touch screen, a gaming system, a portable DVD player, a portable gaming device, a mobile phone, a personal digital assistant (PDA), a music player, a tablet, a laptop computer, a desktop computer, a mobile phone, a media player, a lighting device, a scent generator, and/or any other suitable device that can be used to perform one or more recommended actions. It should be noted that, in some implementations, user device 102 can have an application programming interface such that the recommended output determined by output recommendation engine 126 can be transmitted to a suitable system, such as a home automation system, where the system uses the application programming interface to cause the recommended output to be executed on one or more user devices 102.

In a more particular example, server 120 can determine that a user associated with a user device has a particular objective or goal (e.g., getting more exercise during the course of the user's workday). In response to receiving authorization from the user of user device 102 to access social networking data, location data, and calendar data from various devices and other data sources, server 120 can determine that the user of the user device is currently feeling relatively low energy based on the social data and that the user has a meeting that is scheduled at a particular time and that is taking place at a particular location from the calendar data (with no obligations between the current time and the time of the meeting). Server 120 can use such data and take into account historical data. For example, based on biometric data from a wearable pedometer associated with the user, server 120 can determine the amount of activity that the user of user device 102 has engaged in that month to date or week to date and determine whether the user is likely to meet an indicated objective or goal or likely to meet an average activity level. In another example, based on location information, server 120 can determine the frequency that the user uses a car service to attend meetings at a particular location that is ten blocks away from a work location associated with the user. In yet another example, based on stated interests and/or affinities on a social networking service, server 120 can determine that the user of user device 102 likes flowers. In a further example, using mapping data that determines a route between the work location associated with the user and the location of the meeting. Taking into account these portions of data from multiple devices and/or data sources, server 120 can cause one or more recommended actions to be executed on one or more devices, such as a notification to a user device that prompts the user to purchase a cup of coffee from a nearby coffee shop in five minutes, a notification to a user device that prompts the user to walk to the meeting using a particular route that includes an option to visit an orchid shop that recently opened in a location that is along the provided route. Alternatively, server 120 can, at a particular time prior to the meeting, cause a scent generator located in proximity of user device 102 to emit a lavender scent. In another alternative example, server 120 can, at a particular time prior to the meeting, determine the weather in proximity of user device 102 prior to causing a notification that prompts the user to walk to the meeting using a particular walk (e.g., upon determining that the chance of precipitation is greater than a particular threshold value, upon determining that it is "too hot" for the user based on the determined temperature and user data as to what is considered "too hot," etc.).

Continuing with this example, server 120 can determine that the user of the user device has visited the orchid shop and/or that the user is walking to the coffee shop as recommended by the recommended action and server 120 can use an application programming interface of the coffee shop to request the number of consumers in the coffee shop and can determine that the user may have a particular waiting time at the coffee shop. Server 120 can then determine, using its respective application programming interface, that another coffee shop within the same franchise has a lesser waiting time and is close to the user of user device 102 (e.g., a block away from the current location provided by user device 102). Server 120 can transmit an updated or revised recommended action to user device 102.

In some implementations, it should be noted that server 120 can identify one or more user devices 102 or other suitable devices for executing a recommended action that are in a particular proximity of the user (e.g., a television, an audio system, a media player, a scent generator, a lighting system, etc.). For example, server 120 can cause user device 102 to detect devices that are connected to user device 102 and detect devices that are in proximity of user device 102 (e.g., using device discovery functions). In response, server 120 can cause a song that is deemed to be a relaxing song to be streamed from a service (e.g., a media streaming service) and output using a device (e.g., a mobile phone, a media player, etc.) associated with the user. In addition, server 120 can cause a lavender scent to be emitted using a scent generator at a particular time in response determining that the user likes lavenders (e.g., based on information published on the user's social network page) and based on the current emotional state of the user.

In some implementations, server 120 can personalize services for multiple users that each have a corresponding user device based on the combined physical or emotional state of the users. For example, the users can be a group of users having user devices that are in the same location (e.g., a coffee shop, a conference room, proximity of a given user, a town, an office, etc. based on location information or an online calendar), a group of users having user devices that are connected to each other on a social networking service, a group of users having user devices that are determined to be similar users, and/or any other suitable users.

Referring back to FIG. 1, system 100 can include one or more servers 120. Server 120 can be any suitable server or servers for providing access to the mechanisms described herein for personalizing services based on mood and/or behavior information from multiple data sources, such as a processor, a computer, a data processing device, or any suitable combination of such devices. For example, the mechanisms for personalizing services based on mood and/ or behavior information from multiple data sources can be distributed into multiple backend components and multiple frontend components and/or user interfaces. In a more particular example, backend components (such as mechanisms for identifying an objective for a user, selecting particular portions of data from one or more data streams, generating profile information, determining recommended actions for one or more devices associated with the user, etc.) can be performed on one or more servers 120. In another more particular example, frontend components (such as presentation of a recommended action in the form of content, executing a recommended action, detecting that a user device is near other devices, etc.) can be performed on one or more user devices 102 and/or display devices 110.

In some implementations, each of user devices 102, data sources 110 and server 120 can be any of a general purpose device, such as a computer, or a special purpose device, such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 102 can be implemented as a smartphone, a tablet computer, a wearable computer, a vehicle computing and/or entertainment system (e.g., as used in a car, a boat, an airplane, or any other suitable vehicle), a laptop computer, a portable game console, a television, a set-top box, a digital media receiver, a game console, a thermostat, a home automation system, an appliance, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), a peer-to-peer connection, etc. Each of communications links 104, 108, and 112 can be any communications links suitable for communicating data among user devices 102, data sources 110, and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for personalizing services based on mood and/or behavior information from multiple data sources. For example, system 100 can include: a data selection server 120 that facilitates the selection of data from multiple data sources that is indicative of an emotional state of the user; a profile server 120 that generates a baseline profile to assign the user into a group of users, determines a target profile based on the assigned group of user and based on the objectives or goals of the user, generates a current profile representing the user, and compares the current profile with the target profile; a recommendation server 120 that determines one or more recommended actions that may have a likelihood of impacting the emotional state of the user and/or may move the user towards an objective or goal; a delivery server 120 that causes the recommended action to be executed (e.g., transmit content to a particular device, transmit instructions to a home automation system, etc.); and/or any other suitable servers for performing any suitable functions of the mechanisms described herein.

Figure 3:
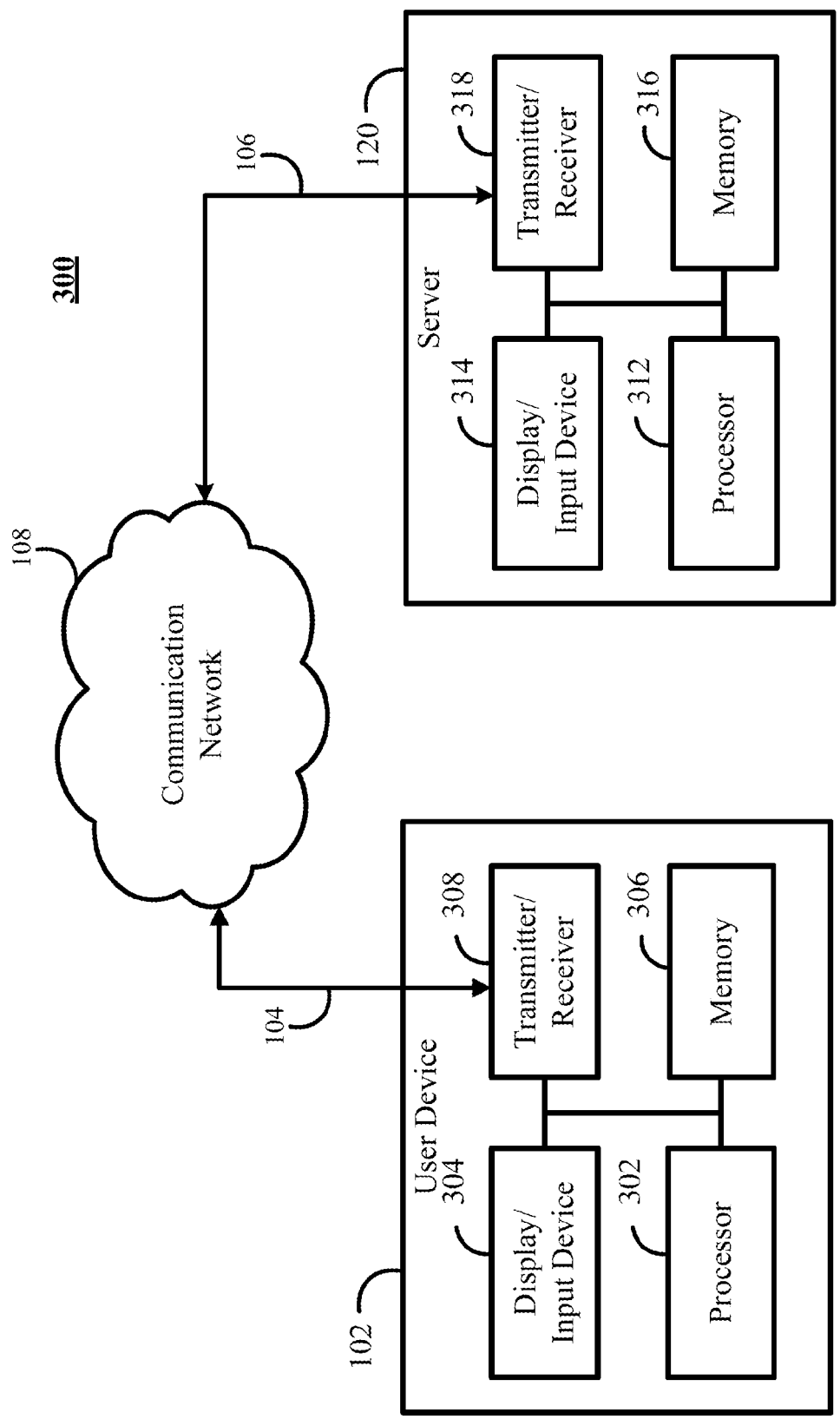
FIG. 3 shows a detailed example of hardware that can be used to implement one or more of the user devices and servers depicted in FIG. 1 in accordance with some implementations of the disclosed subject matter.

FIG. 3 shows an example 300 of hardware that can be used to implement one or more of user devices 102 and servers 120 depicted in FIG. 1 in accordance with some implementations of the disclosed subject matter. Referring to FIG. 3, user device 102 can include a hardware processor 302, a display/input device 304, memory 306, and a transmitter/receiver 308, which can be interconnected. In some implementations, memory 306 can include a storage device (such as a computer-readable medium) for storing a user device program for controlling hardware processor 302.

Hardware processor 302 can use the user device program to execute and/or interact with the mechanisms described herein for personalizing services based on mood and/or behavior using multiple data sources, which can include presenting one or more recommendation interfaces (e.g., for inputting objective or goal information, for providing authorization to access data from one or more data sources, for selecting data sources, etc.), and can include executing a recommended action. In some implementations, hardware processor 302 can transmit and receive data through communications link 104 or any other communication links using, for example, a transmitter, a receiver, a transmitter/receiver, a transceiver, and/or any other suitable communication device, such as transmitter/receiver 308. Display/input device 304 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 308 can include any suitable transmitter and/or receiver for transmitting and/or receiving, among other things, instructions for presenting content, information related to a current control level, requests for location information, etc., and can include any suitable hardware, firmware and/or software for interfacing with one or more communication networks, such as network 106 shown in FIG. 1. For example, transmitter/receiver 308 can include: network interface card circuitry, wireless communication circuitry, and/or any other suitable type of communication network circuitry; one or more antennas; and/or any other suitable hardware, firmware and/or software for transmitting and/or receiving signals.

Server 120 can include a hardware processor 312, a display/input device 314, memory 316 and a transmitter/receiver 318, which can be interconnected. In some implementations, memory 316 can include a storage device (such as a computer-readable medium) for storing a recommendation program for controlling hardware processor 312.

Hardware processor 312 can use the recommendation program to execute and/or interact with the mechanisms described herein for: obtaining information associated with an objective of a user of a computing device from a plurality of data sources; identifying an objective for a user of a user device; receiving information associated with the user from multiple data sources; determining that a portion of information from each of the multiple data sources is relevant to the user having the identified objective; assigning the user into a group of users from a plurality of groups based on the identified objective and the portion of information from each of the multiple data sources; determining a target profile associated with the user based on the identified objective and the assigned group; generating a current profile for the user based on the portion of information from each of the multiple data sources; comparing the current profile with the target profile to determine a recommended action, where the recommended action is determined to have a likelihood of impacting the emotional state of the user; causing the recommended action to be executed (e.g., on a device possessed by, or located proximate to, the user); determining one or more devices connected to the computing device, wherein each of the one or more devices has one or more device capabilities; and/or transmitting and receiving data through communications link 108. In some implementations, the recommendation program can cause hardware processor 312 to, for example, execute at least a portion of process 400 as described below in connection with FIG. 4. In some implementations, hardware processor 312 can transmit and receive data through communications link 114 or any other communication links using, for example, a transmitter, a receiver, a transmitter/receiver, a transceiver, and/or any other suitable communication device such as transmitter/receiver 318. Display/input device 314 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 318 can include any suitable transmitter and/or receiver for transmitting and/or receiving, among other things, content to be presented, requests for status information of display device 110, requests for content, requests for location information, etc., and can include any suitable hardware, firmware and/or software for interfacing with one or more communication networks, such as network 106 shown in FIG. 1. For example, transmitter/receiver 318 can include: network interface card circuitry, wireless communication circuitry, and/or any other suitable type of communication network circuitry; one or more antennas; and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or data sources 110. Additionally or alternatively, as described above in connection with FIG. 1, multiple servers 120 can be implemented to perform different tasks associated with the mechanisms described herein.

Figure 4:
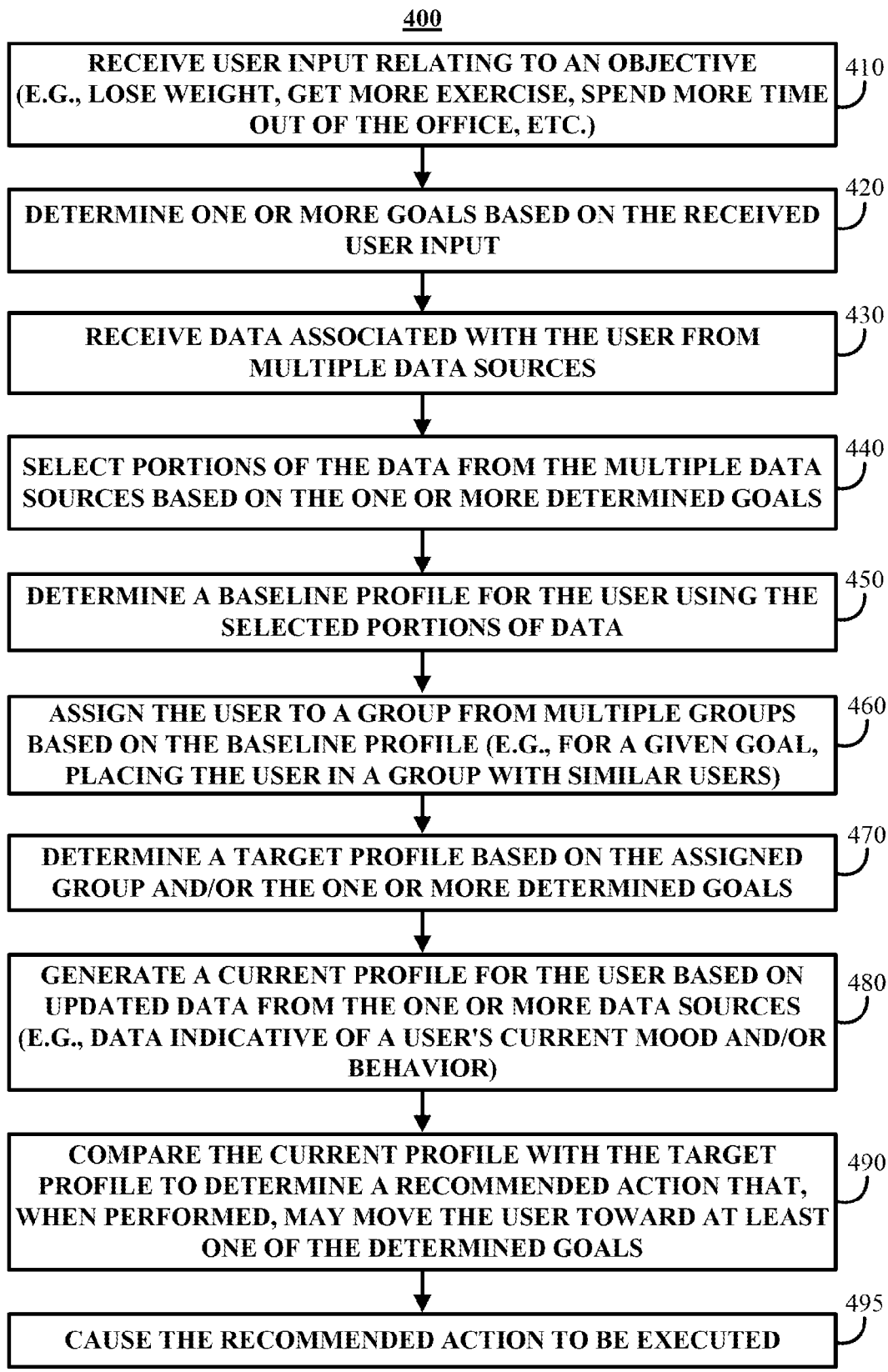
FIG. 4 shows an illustrative example of a process for personalizing computerized services based on mood and/or behavior information from multiple data sources in accordance with some implementations of the disclosed subject matter.

Turning to FIG. 4, an illustrative example 400 of a process for personalizing computerized services based on the physical or emotional state of a user of a user device using data from multiple data sources in accordance with some implementations of the disclosed subject matter is shown.

It should be noted that process 400 can personalize computerized services, where data from multiple data sources can be used to determine the impact of a computerized service on a physical or emotional state of a user having a user device. The emotional state of a user can be a complex phenomenon. Emotion can be a mental state that is associated with physiological activity and can be influenced by internal or external environmental conditions. Emotion can be associated with personality, mood, temperament, disposition, and motivation of a user. For example, emotional states can include happiness, contentment, tranquility, surprise, anger, fear, sadness, depression, disgust, tired, anxious, hurried, etc. In some examples, emotional states can be broadly classified into positive and negative emotions, where positive emotions can include happiness and contentment and negative emotions can include anger and depression. In addition, an example of an internal environmental condition includes an old memory and an example of external stimulus includes stress or the relief of stress due to various environmental factors.

It should also be noted that the physical or emotional state of a user can be considered an overall snapshot or view of the user's physical characteristics or emotions at a point in time. Because multiple factors can be involved in a user's physical or emotional state, the physical or emotional state can fluctuate even over short periods of time. By using data relating to the user from multiple sources, a user's physical or emotional state can be predicted, which can be used to determine whether to recommend a particular computerized action at a given time. Moreover, changes to a user's physical or emotional state can be predicted based on new or updated data relating to the user from multiple sources. Even further, changes to a user's physical or emotional state can be used to evaluate whether recommended computerized actions to devices possessed by, or located proximate to, the user may be moving the user towards a particular goal or objective.

As illustrated, process 400 can begin by receiving user input relating to a particular objective or goal at 410. Illustrative examples of a particular objective or goal can be getting more exercise (e.g., generally increasing the current activity level, getting any form of exercise for at least one hour per day, etc.), losing weight (e.g., generally losing weight, losing ten pounds in three months, etc.), making more friends, accomplishing a particular emotional state (e.g., feel more productive, feel less stressed, etc.), etc.

In a more particular example, in response to receiving authorization from a user of a user device to access social data relating to the user from a social networking service, process 400 can extract keywords from social media posts published by the user on the social networking service to determine one or more objectives of the user. In this example, social data relating to the user from a social networking service can be received, which can include messages or posts having text, image content, video content, and/or audio content, messages posted by other users that are connected to the user, and contextual information, such as timing information, location information, and a declared mood or emotional state of the user or users connected to the user.

Figure 5:
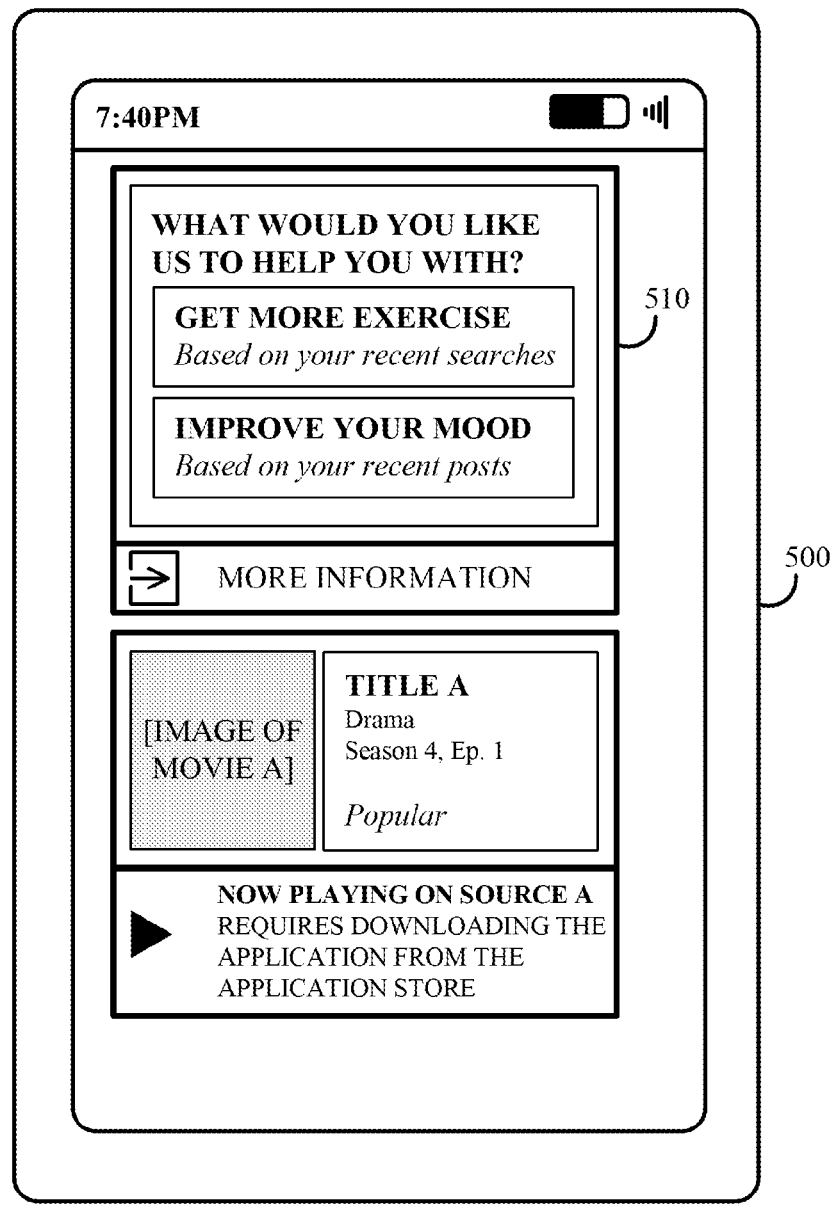
FIG. 5 shows an illustrative example of a user interface for prompting the user of the user device to provide an objective in accordance with some implementations of the disclosed subject matter.

In another more particular example, in response to installing a recommendation application on a computing device associated with the user, the recommendation application can present a recommendation interface on the computing device that prompts the user to select an objective from the user interface. For example, the recommendation interface can be presented as a recommendation card, a notification, or any other suitable user interface that prompts the user to indicate an objective or goal. An illustrative example of a recommendation interface that can be presented on a computing device is shown in FIG. 5. As shown, in some implementations, a user device 102, such as a mobile device 500, can prompt the user to input an objective in recommendation interface 510, such as "get more exercise" or "improve your mood." The suggested objectives in recommendation interface 510 can be presented based on any suitable criterion (e.g., default objectives, popular objectives, objectives selected based on recent searches inputted into the user device, objectives selected based on location information associated with the user device, objectives based on attributes inferred from data sources authorized by the user of the user device, etc.). As also shown, a reason for the suggested objective can be provided, such as "Based on your recent searches" and "Based on your recent posts." Additionally or alternatively, the recommendation interface can present the user of mobile device 500 with a search field to provide keywords relating to an objective or goal that the user desires to achieve.

Referring back to FIG. 4, at 420, the recommendation system can determine one or more goals for a user of a user device based on the determined objective. For example, in response to determining that the objective is to lose weight, the recommendation system can determine goals that are associated with the objective of losing weight—e.g., achieving a first activity level for the first week and a second activity level for the second week, achieving an average activity level over the first month, waking up at a particular time every morning, achieving a threshold amount of rest at the end of each day, eating at particular times on weekdays, etc. As described hereinbelow, the recommendation system can generate various profiles, such as profiles of similar users that each have user devices, profiles of users having user devices who have indicated that they have achieved the determined objective or one of the goals, profiles of users having user devices who have indicated that they have failed to achieve the determined objective or one of the goals, etc. In this example, the recommendation system can process these profiles to determine goals associated with an objective (e.g., which goals were achieved by users that are deemed to be similar to the user, which goals were achieved within a particular amount of time, etc.). In a more particular example, in response to selecting one of the objectives presented in recommendation interface 510, the recommendation system can determine multiple goals associated with the selected objective and select a portion of those goals based on profile information.

In some implementations, the recommendation system can receive any suitable data associated with the user from multiple data sources at 430. For example, from one or more data sources, the recommendation system can receive and/or request data relating to activities engaged in by one or more users of user devices, such as took a walk and the distance traversed using a mobile device with location services, visited a location that corresponds with a coffee shop using a mobile device with social services, attended a social event (e.g., a conference, a party, a sporting event, etc.) using a mobile device with an online calendar, attended a fitness training session using a mobile device with an online calendar and/or social services, etc. As another example, from one or more data sources, the recommendation system can receive and/or request data that includes timing information related to an activity, such as a duration of the activity, a time corresponding to the activity, etc. As yet another example, the recommendation system can receive and/or request data that includes a number of occurrences of an activity engaged in by one or more users during a given time period (e.g., a day of the week, a couple of days, weekdays, weekends, etc.), a number of users that engage in a given activity, and/or any other suitable information relating to frequency information related to a given activity.

In some implementations, the recommendation system can receive and/or request data relating to content and/or information published by the user on a social networking service. For example, the data can include one or more mood states published by a user on a service (e.g., a social networking service, a messaging service, a video sharing service, a photo sharing service, an electronic commerce service, etc.). As another example, the data can include comments, messages, posts, locations, and/or any other suitable content published by the user on a social networking service. As still another example, the data can include any suitable information relating to one or more social connections of the user on a social networking service, content posted by the social connections, locations associated with the social connections, etc.

In some implementations, the recommendation system can receive and/or request data relating to user interactions with one or more media content items. For example, the data can include any suitable information relating to a media content item with which the user has interacted. In a more particular example, the data can include a type of the media content item, a description of the media content item, a link to the media content item (e.g., a URL), an identifier that can identify the media content item (e.g., a URI, a program identifier, etc.), an author of the media content item, an artist related to the media content item, etc. As another example, the data can include any suitable information about a type of a user interaction with a media content item on a user device, such as consuming the media content item, publishing the media content item via a social networking service or any other suitable service, sharing the media content item with other users, liking the media content item via a social networking service or any other suitable service, commenting on the media content item, etc. As yet another example, the data can include any suitable timing information related to a user interaction with a media content item on a user device, such as a duration of the user interaction, a time corresponding to the user interaction, etc.

In some implementations, the recommendation system can receive and/or request biometric data associated with the user of a user device. For example, in response to receiving authorization to access biometric data from a data source that includes a sensor, the biometric data can include any suitable physiological parameter associated with the user, such as a heart rate, a respiration rate, a blood pressure, a body temperature, skin moisture, etc. As another example, the biometric data can include a range of physiological parameters, such as a heart rate range, a blood pressure range, etc.

In some implementations, the recommendation system can receive and/or request location data associated with the user of a user device. For example, in response to receiving authorization to access location information, the location data can include any suitable information that can be used to estimate a location of a computing device associated with the user, such as an identifier associated with the computing device (e.g., an IP address, a device identifier, a media address control (MAC) address, a serial number, a product identifier, etc.), GPS signals generated by the computing device, Wi-Fi access points associated with the computing device, information about a cell tower to which the computing device is connected, etc. As another example, the location data can include any suitable information that can be used to estimate a location of the user, such as a location published by the user using a suitable service (e.g., a social networking service), a location that a user intends to visit (e.g., a location associated with a social event scheduled using a calendar application executing on a mobile device, a social network account associated with the user, etc.), etc.

Figure 6:
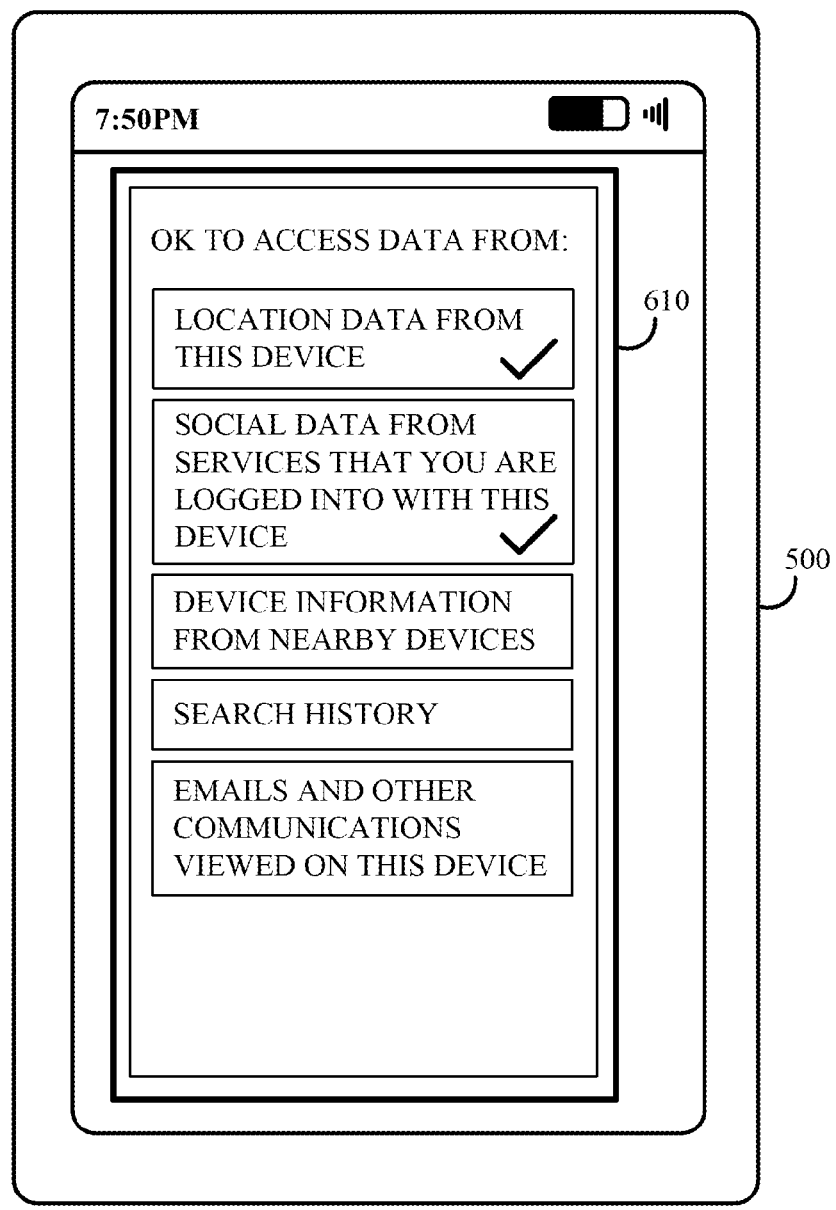
FIG. 6 shows an illustrative example of a user interface for prompting the user of the user device to select one or more data sources for retrieving data relating to the user in accordance with some implementations of the disclosed subject matter.

In some implementations, the recommendation system can present a recommendation interface, such as the recommendation interface shown in FIG. 6, where the user of mobile device 500 is prompted with data sources for selection. For example, various data sources can be detected by the recommendation system executing on mobile device 500 and, in response to detecting the various data sources, the user can be prompted to select which data sources to obtain data associated with the user. As shown in FIG. 6, a recommendation interface prompts the user of mobile device 500 to select from various data sources that are available to the recommendation application, where the user has indicated a permission to access location data from mobile device 500 and social data from services that have been authenticated using mobile device 500. In a more particular example, the recommendation system can prompt the user to provide authorization to access particular data sources and select which data sources may include data that is relevant towards accomplishing a goal or objective. In this example, the recommendation system can provide an interface prompting the user of the user of the user device to provide credentials, such as a username and password, for accessing a particular data source.

In some implementations, the recommendation system can prompt the user to provide additional information in response to selecting one or more data sources for obtaining user, such as using recommendation interface 610. For example, the recommendation system can determine that, in order to generate a baseline profile for the user, certain portions of the baseline profile can be derived or satisfied using data obtained from the selected data sources and other portions of the baseline profile remain incomplete. In response, the recommendation system can generate an interface that prompts the user to provide such information—e.g., if the goal is "losing weight," such an interface can prompt the user of mobile device 500 to input a height value and a weight value.

Referring back to FIG. 4, the recommendation system can select portions of the data received from multiple data sources based on the objectives or determined goals at 440. For example, the recommendation system can receive data from multiple data sources (e.g., using one or more application programming interfaces) and can determine that the received data is to be classified into various categories of data. These categories can include, for example, general data, contextual data, social data, and personal data. Examples of general data can include information about one or more services used by a user (e.g., a social networking service, an email service, a messaging service, a video sharing service, etc.), search history associated with a user (e.g., keywords inputted by the user), etc. Examples of contextual data can include information about a location of user device 102, traffic information, weather information based on location information from user device 102 (e.g., "sunny," "cold," etc.), population density information within a given location, a location context relating to data provided by a data source 110 (e.g., "work," "home," "vacation," etc.), information relating to devices located near or connected to a user device, and/or any other suitable information that can provide contextual information related to the user. Examples of social data can include information related to social events involving multiple users (e.g., a conference scheduled using a social networking service, a calendar application, etc.), content and/or information published by one or more users using a service (e.g., a social networking service, a video sharing service, a photo sharing service, etc.), information about one or more social connections of a user, and/or any other suitable information that can be classified as social data. Examples of personal data can include personal interests of a user (e.g., a user's stated interest available on a social networking service, media content consumed and/or liked by a user, etc.), one or more utterances generated by a user, and/or any other suitable information that can be regarded as personal.

Figure 7:
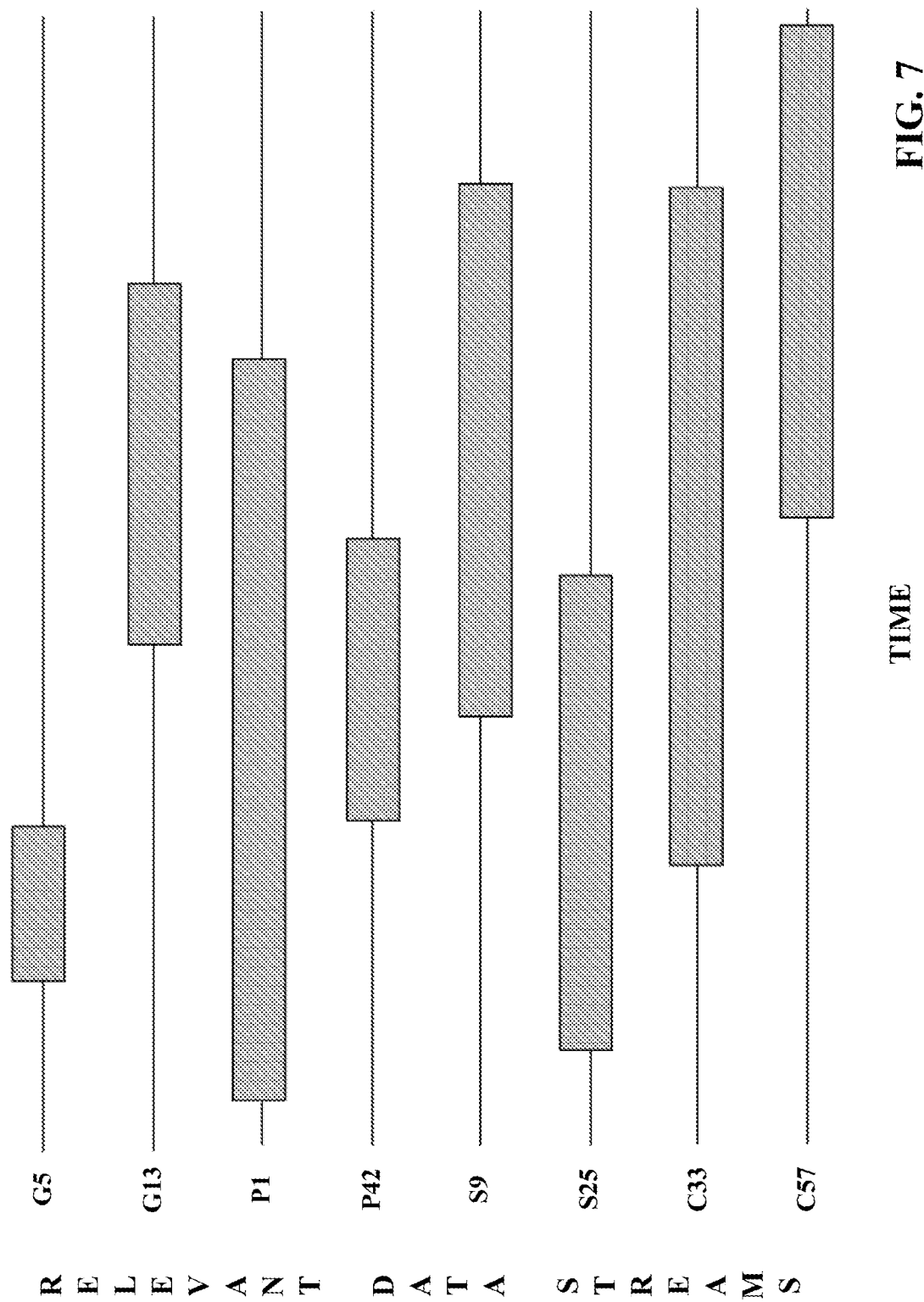
FIG. 7 shows an illustrative example of a portion of data at various times selected from the data that is received from multiple data sources based on a particular objective or goal in accordance with some implementations of the disclosed subject matter.
Figure 8:
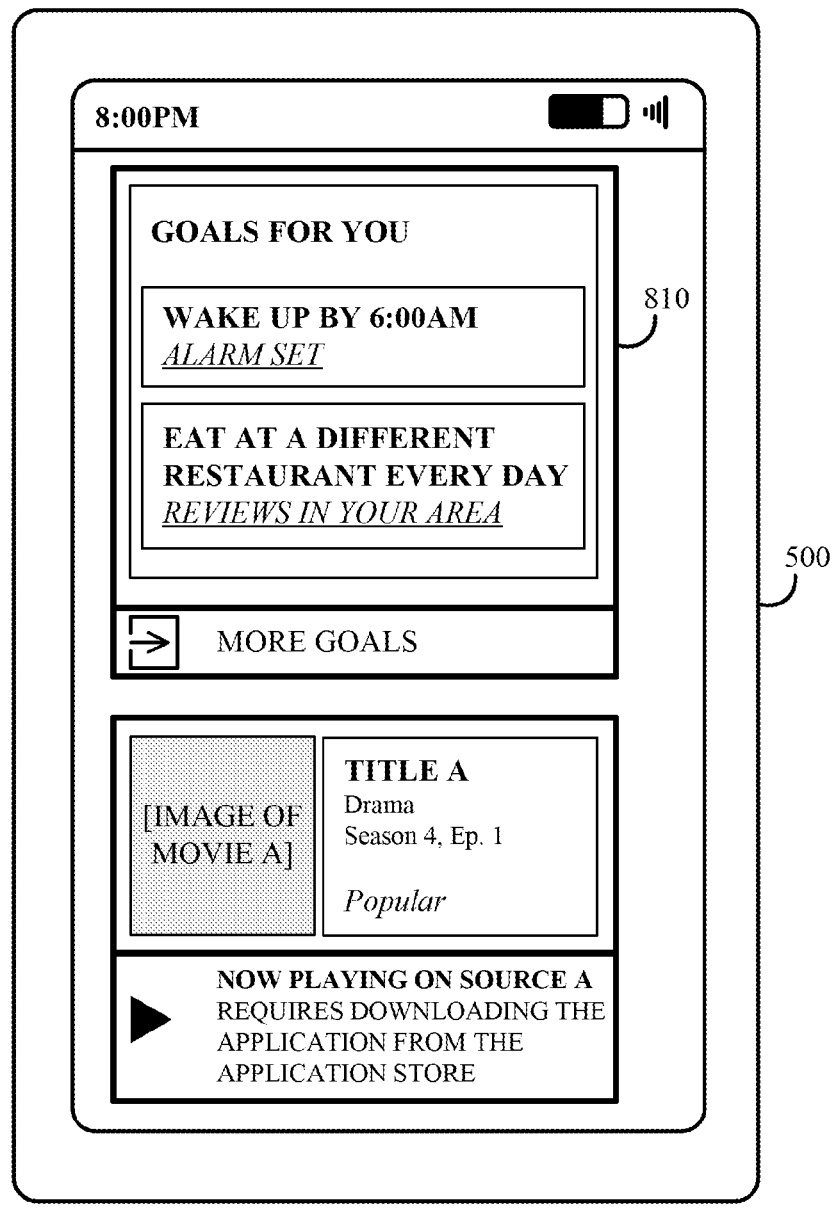
FIG. 8 shows an illustrative example of a user interface for presenting the user with selectable goals corresponding to an objective in accordance with some implementations of the disclosed subject matter.

In some implementations, the recommendation system can create a data stream for each category of data. For example, in response to categorizing particular data from multiple services as being social data, the recommendation system can aggregate the social data as it is being received and create a social data stream that includes timestamped social data from the multiple sources. Alternatively, upon receiving authorization from the user to access a particular data source, the recommendation system can categorize the data received from that source and place the data into a data stream that is associated with that data source, such as a social data stream of timestamped social data from a particular social source. For example, as shown in FIG. 7, multiple data streams from multiple data sources can be obtained—e.g., general data (G5 and G13), personal data (P1 and P42), social data (S9 and S25), and contextual data (C33 and C57).

In some implementations, the recommendation system can select particular portions of data by determining which categories of data to analyze and which portions of the data are to be used to determine a recommendation action that may, for example, affect the physical or emotional state of the user. In response to determining an objective at 410 or a goal at 420 for the user of the user device, the recommendation system can select particular categories of data that may include data that is relevant to the objective or goal. For example, the recommendation system can determine that social data and contextual data are likely to be relevant to the objective of losing weight. In response to analyzing the data relating to the user from multiple data sources at 430, the recommendation system can select particular categories of data from particular data sources and select particular time portions of data that are indicative or representative of the physical or emotional state of the user. For example, the recommendation system can, in response to receiving authorization from a user of a user device to receive data relating to the user from multiple data sources, determine that, during weekdays between 9 AM and 5 PM, the user device is not typically used on social data sources and that contextual data from the user device and devices connected to the user device are likely to be representative of the emotional state of the user. It should be noted that, using the received data and/or the determined objectives and goals, the recommendation system can select different subsets of data for making different determinations—e.g., a subset of data for recommending a particular action, a subset of data that is indicative of the emotional state of the user during a particular time of the day, a subset of data that is indicative of the emotional state of the user during an average day, a subset of data that is representative of the activities of the user on a given day, etc.

In some implementations, each objective or goal can have an associated data template for retrieving data that is related to the user and that is relevant to the objective or goal. For example, in response to determining an objective at 410 or a goal at 420, the recommendation system can retrieve an associated data template that includes particular data fields, such as particular social-related data fields (e.g., keywords extracted from social posts and an associated time), contextual-related data fields (e.g., location information from multiple devices associated with the user corresponding to the times of each social post), and general data fields (e.g., type of applications that the user device has installed and device profiles of devices that are nearby the user device). As described above, in response to determining that information for particular data fields may not be completed or derived using data from the data sources, the recommendation system can prompt the user to input such missing data (e.g., by generating a user interface prompt the user to input data and/or input the accuracy of inferences made about the user).

It should be noted that, although the recommendation system can make a determination based on particular subsets of data and can retrieve data templates that request particular portions of data, the user of a user device, such as user device 102, can be provided with controls for setting which data sources are used (e.g., a specific social networking service, a specific mobile device, etc.) and which types of data are used by the recommendation system (e.g., social information from a specific social networking service and not data determined to include personal information, social post information from a social networking service and not relationship information from a social messaging service, etc.). For example, the user can be provided with an opportunity to select a particular type of data from a particular data source that may include data relevant to the user for a particular goal or objective.

In some implementations, using the selected portions of data from the multiple data sources, the recommendation system can determine a baseline profile for the user at 450. For example, the recommendation system can process the selected portions of data and generate one or more baseline profiles associated with each objective or goal. In a more particular example, a baseline user profile associated with a goal can include any suitable information relating to the physical or emotional state of the user (e.g., "happy," "unhappy," etc.) and information about one or more user behaviors or habits (e.g., commuting, lunch break, weekly meetings, exercise groups, etc.). In another more particular example, a baseline user profile can use heart rate information, temperature information, galvanic skin response information, location information, and social post information, match such information with an emotional state, and establish baseline patterns for emotional state through a given time period, a day, a week, a season, etc.

In some implementations, using the selected portions of data from the multiple data sources, the recommendation system can determine an overall baseline profile for the user that includes multiple sub-profiles—e.g., a sub-profile that uses the data to predict the current emotional state of the user, a sub-profile that describes the typical activity level of the user, a sub-profile that describes typical behaviors of the user at particular times of the day, etc. Any suitable number of sub-profiles can be generated to create an overall baseline profile of the user. It should also be noted that, in some implementations, the recommendation system can use different subsets of data for each of the sub-profiles that form the overall baseline profile of the user.

In some implementations, the recommendation system can assign the user to a group of users based on the baseline profile at 450. For example, the recommendation system can identify a group of users that have accomplished the goal or objective and one or more behaviors associated with users in the group and/or actions performed by users in the group. In another example, the recommendation system can identify a group of users that have failed to accomplish the goal or objective and one or more user behaviors associated with users in the group and/or actions performed by users in the group. The recommendation system can then correlate particular behaviors and/or actions with the goal for the user.

In some implementations, the recommendation system can use machine learning techniques to identify and cluster similar user profiles. For example, the recommendation system can use machine learning techniques to determine which group profile is most similar to the baseline profile associated with the user and, in response, can place the user into the group associated with that group profile. In another example, the recommendation system can use machine learning techniques to determine which group profile includes users having user devices that are similar to the user of the user device and includes users interested in attaining the same objective. In yet another example, the recommendation system can use machine learning techniques to determine which group profile has sub-profiles that include common features to the sub-profiles that form the overall baseline profile of the user. It should be noted that any suitable machine learning technique can be used, such as a support vector machine, a decision tree, a Bayesian model, etc.

It should be noted that, in some implementations, other information can be used to group similar users together. For example, the group of users can include users having user devices that are in a similar geographic proximity, such as users that are in the same city as a particular user. As another example, the group of users can include users that are connected to each other on one or more social networking services.

It should also be noted that, in some implementations, process 400 can return to 420, where the recommendation system can determine one or more goals for achieving a particular objective based on the assigned group of users. For example, for a particular objective, the recommendation system can retrieve one or more goals that are associated with an assigned group of similar users that have indicated a desire to reach the objective. In another example, for a particular objective, the recommendation system can rank the goals associated with an objective, where the ranking is based on inputs from users in the group of users as to which goals assisted the user in reaching the objective. The recommendation system can then select at least a portion of the goals for the user that may assist the user in reaching the objective. The selected goals can then be presented to the user in a recommendation interface, such as recommendation interface 800 shown in FIG. 8. In this example, the recommendation system can provide the user of mobile device 500 with an opportunity to remove and/or add additional goals.

In some implementations, the recommendation system can use the baseline profile generated at 450 for other determinations. For example, the recommendation system can determine whether a current profile that includes updated data relating to the user from multiple data sources deviates from the previously generated baseline profile. Deviations between the baseline profile and the current profile can include, for example, a comparison of the frequency of particular activities (e.g., exercise frequency) and a comparison of the timing information relating to particular behaviors (e.g., the time when the user wakes up each day). Such a deviation can indicate that the data or such determinations based on the data may not be indicative of the emotional state of the user (e.g., a stress response may be detected from the user in response to a job change). Such a deviation can also indicate that the recommendation system is to update the baseline profile and/or update the assignment of the user into another group of users (e.g., as the user is progressing towards a goal or objective, as the behaviors of the user have changed over time, etc.). In another example, such a deviation can indicate that the recommendation system is to recommend actions that may return the user back to the baseline profile.

In a more particular example, the baseline profile generated by the recommendation system can include behaviors and/or activities associated with the user (e.g., consuming classical music, attending a fitness session, etc.), timing information relating to each of the behaviors and/or activities (e.g., time spent listening to classical music), frequency of a particular behavior and/or activity over a given time period (e.g., the number of times the user using the user device has listened to classical music during the week), threshold values associated with behaviors and/or activities (e.g., the user tends to listen to classical music at least three times a week for at least thirty minutes each session), etc.

In another more particular example, the baseline profile generated by the recommendation system can include any suitable representation of data related to the user. For example, in response to receiving a particular portion of biometric data, the recommendation system can determine an average heart rate for the user while at the office, an average number of calories burned on weekdays, and an activity curve for an average day for the user.

It should also be noted that multiple baseline profiles can be generated and associated with the user of the user device. For example, the recommendation system can generate a baseline profile using a first subset of data that is associated with a goal (e.g., getting at least thirty minutes of exercise per day) and another baseline profile using a second subset of data that is associated with another goal (e.g., using an email application for less than a particular amount of time). In another example, the recommendation system can generate a baseline profile in a particular context, such as "work," and another baseline profile in another context, such as "vacation."

In some implementations, the recommendation system can generate a target profile based on the assigned group, the goals, and/or the objective at 470. For example, for a particular objective, the recommendation system can identify and cluster user profiles of users where it has been determined that the user has met a goal or an objective. In another example, the recommendation system can identify and cluster user profiles of users where it has been determined that the user has not met a goal or an objective (e.g., to determine which actions may not be assisting users in meeting a particular goal or objective). In yet another example, the recommendation system can identify and cluster user profiles of users that the recommendation system has previously assisted the users in attaining a stated goal or objective.

In a more particular example, the recommendation system can generate a target profile for achieving a particular goal or objective using a profile that includes information relating to users that have met the particular goal or objective and information relating to users that have not met the particular goal or objective. In this example, the recommendation system can determine actions, threshold values, and other information that may assist the user in attaining the particular goal or objective—e.g., users that have been determined to achieve the objective of losing ten pounds in a month have also walked at least one mile each day, woken up by 6 AM in the morning, listened to classical music in the evening, and eaten meals at particular times. By, for example, determining common features between users that have indicated an achievement of the particular goal or objective, the recommendation system can generate a target profile that can be used to recommend actions to the user. These actions, if performed, may affect the current profile of the user such that the current profile of the user moves towards the target profile.

Referring back to FIG. 4, in some implementations, the recommendation system can generate a current profile for the user based on updated data from the multiple data sources at 480. It should be noted that the baseline profile and the current profile associated with the user can be dynamic profiles that can be generated using updated data from the multiple data sources. For example, in response to determining that a particular period of time has elapsed (e.g., one minute, one day, etc.), the recommendation system can receive and/or request updated data from the multiple data sources and generate a current profile for the user. Alternatively, the recommendation system can continue to use the baseline profile.

In some implementations, the recommendation system can compare the current profile with the target profile to determine a recommended action at 490. This may, for example, impact the physical or emotional state of the user. Based on the objective or goal and the profile information, the recommendation system can determine which computerized action is to be executed at the user device, a device that the user possesses, or a device that is proximate to the user device.

In some implementations, the recommendation system can determine multiple computerized actions that are recommended to the user of the user device at various times. For example, the recommendation system can determine that a user has the particular objective of getting more exercise during the course of the user's workday. In response to receiving authorization from the user of a user device to access social networking data from a social networking service, location data from a mobile device associated with the user, and calendar data from an online calendar associated with the user, the recommendation system can determine that the user is currently feeling a relatively low energy from the social data and that the user has a meeting that is scheduled at a particular time and that is taking place at a particular location from the calendar data (with no obligations between the current time and the time of the meeting). The recommendation system can use such data and incorporate other data into a dynamic user profile. For example, based on biometric data from a wearable pedometer associated with the user, the recommendation system can determine the amount of activity that the user has engaged in that month to date or week to date and determine whether the user is likely to meet an indicated objective or goal or likely to meet an average activity level. In another example, based on location information, the recommendation system can determine the frequency that the user uses a car service to attend meetings at a particular location that is ten blocks away from a work location associated with the user. In yet another example, based on stated interests and/or affinities on a social networking service, the recommendation system can determine that the user of the user device likes flowers. In a further example, using mapping data, the recommendation system can determine a route between the work location associated with the user and the location of the meeting. Taking into account these portions of data from multiple data sources, the recommendation system can generate a current profile associated with the user and compare it with a target profile that can be associated with the particular objective and/or with a particular group of users. Based on the comparison, the recommendation system can cause one or more recommended actions to be executed, such as a notification that prompts the user to purchase a cup of coffee from a nearby coffee shop in five minutes, a notification that prompts the user to walk to the meeting using a particular route that includes an option to visit an orchid shop that recently opened in a location that is along the provided route. Alternatively, the recommendation system can, a particular time prior to the meeting, cause a scent generator located in proximity of the user device to emit a lavender scent. In another alternative example, the recommendation system, at a particular time prior to the meeting, determine the weather in proximity of the user device prior to causing a notification that prompts the user to walk to the meeting using a particular route as identified by a computer map route service, such as Google Maps (e.g., upon determining that the chance of precipitation is greater than a particular threshold value, upon determining that it is "too hot" for the user based on the determined temperature and user data as to what is considered "too hot," etc.).

Continuing with this example, the recommendation system can determine that the user has visited the orchid shop and/or that the user is walking to the coffee shop as recommended by the recommended action. The recommendation system can then use an application programming interface corresponding to the coffee shop to request the number of consumers in the coffee shop and can determine that the user may have a particular waiting time at the coffee shop. The recommendation system can, using its respective application programming interface, then determine that another coffee shop within the same franchise has a lesser waiting time and is nearby the user of the user device (e.g., a block away from the current location provided by the user device). The recommendation system can transmit an updated or revised recommended action to the user device.

It should be noted that each of these multiple computerized actions can be associated with a corresponding trigger event. For example, an action, such as the notification prompting the user to purchase coffee from a nearby coffee shop, can be triggered based on an associated time (e.g., time of day, time of the preceding event, time until the next scheduled event begins, etc.). In another example, an action, such as the notification prompting the user to visit an orchid shop along the route to a scheduled meeting, can be triggered based on location information associated with the user device (e.g., detecting that the user device is within a particular proximity of the orchid shop). In yet another example, the recommendation system can determine that the action is a message that is to be presented in a particular form (e.g., by email, text message, mobile notification, account notification, and/or in any other suitable manner) and/or at a particular time (e.g., based on the predicted emotional state of the user).

Referring back to FIG. 4, the recommendation system can cause the recommended action or actions to be executed at 495. Illustrative examples of recommended actions are shown in FIG. 2. As shown, the action or output can include, among other things, a haptic or touch sensitive feedback, a sensory feedback (e.g., image content, light cues, music, video messages, video content, etc.), an ambient-related feedback (e.g., causing a scent to be emitted from a suitable device, modifying a lighting scheme by a lighting or home automation system, etc.), and/or a content-related action (e.g., presenting text, image content, video content, audio content). In a more particular example, the recommended action can include modifying a sound, cancelling a sound, or enhancing a sound in the background of the user of the user device using an audio output device that is connected to the user device. In another more particular example, the recommended action can include providing sensory feedback (e.g., light cues, audio cues, video cues, scent cues, etc.) in the environment of the user of the user device to provide a notification. In yet another more particular example, the recommended action can include nostalgia-oriented feedback including content-related actions based on historical information relating to the user. In a further example, the recommended action can include a prioritization of application data based on device information and other information relating to the user (e.g., the organization of user interface elements, the positioning of documents or files, etc.).

In some implementations, the recommendation system can, based on the recommended action, identify one or more devices that may be connected to, or proximate to, the user of user device for executing the recommended action. In some implementations, the recommendation system can initiate device discovery functions to determine which device or devices are near the user device. In some implementations, such device discovery functions can be initiated in response to launching a recommendation application on the user device or in response to determining that a recommended action is to be executed using a device. Additionally or alternatively, in some implementations, such device discovery functions can be initiated from any suitable device and can use any suitable information to determine which devices are near the user device.

In some implementations, the user device can determine whether any output devices are nearby. The user device or the recommendation application executing on the user device can use any suitable technique or combination of techniques to determine whether any output devices are nearby. For example, the user device can transmit a signal or signals including a message requesting that nearby devices (e.g., devices which receive the signal) to respond with a message indicating that the device received the signal. In this example, the response can include any suitable device information, such as device location information and device capability information. As another example, the user device can receive a signal or signals transmitted by a device including a message indicating that the display device is available for causing a recommended action or output to be executed. Such signals can be transmitted using, for example, peer-to-peer communication techniques such as Bluetooth, using RFID techniques, and/or using any other suitable technique or combinations of techniques for communicating between the user device and one or more output devices.

Figure 9:
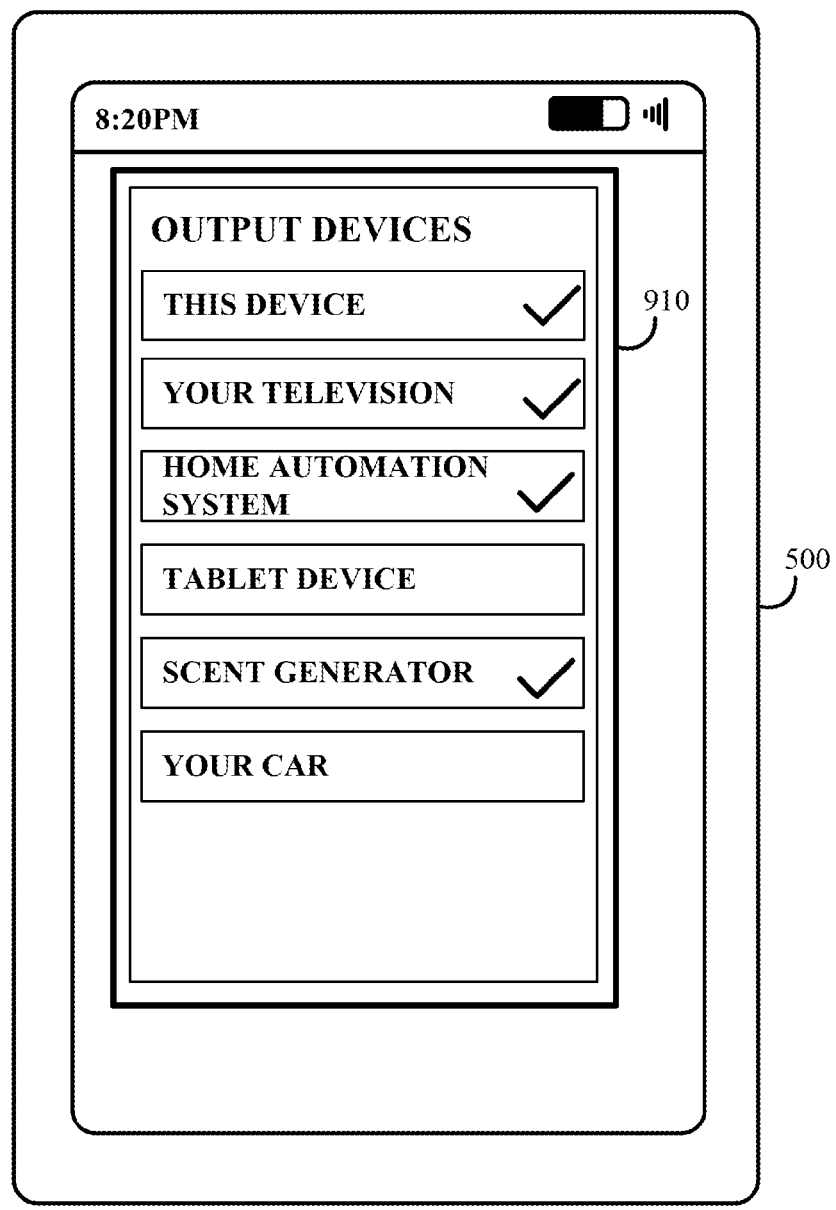
FIG. 9 shows an illustrative example of a user interface for presenting the user with selectable output devices that can be used to execute a recommended action in accordance with some implementations of the disclosed subject matter.

In some implementations, the recommendation system can provide the user with the opportunity to select one or more output devices that are available for executing a recommended action. For example, as shown in FIG. 9, recommendation interface 910 can provide the user with the opportunity to select, add, or remove various output devices that have been detected as being connected to or proximate mobile device 500. As shown, such output devices can include a television device, a home automation system, a tablet computing device, a scent generator, and an automobile. In some implementations, the recommendation interface can provide the user with the opportunity to request that the user device detect additional output devices (e.g., in response to moving to a different location that is in the proximity of other devices).

In some implementations, the recommendation system can cause an output device to execute a particular action based on the physical or emotional state of the user. For example, prior to executing the particular action using the output device, the recommendation system can determine the current emotional state of the user and, upon determining that the emotional state of the user is "angry" based on user data, can inhibit the action from being executed on the output device. In another example, the recommendation system can determine that the particular action can be executed on the output device upon determining that the emotional state of the user is anything except for "angry"—e.g., as the recommendation system has determined from historical user data that actions taken by one or more output devices are not well received when the user is experiencing an "angry" emotional state.

Additionally or alternatively, in some implementations, the recommendation system can cause an output device to execute a particular action based on the predicted impact of the particular action on the current physical or emotional state of the user. For example, prior to executing a particular action using the output device, the recommendation system can determine the predicted impact of the action on the physical or emotional state of the user and, upon determining that the predicted impact is not within a particular range (e.g., the emotional state correlated with the user data remains unchanged), can inhibit the action from being executed on the output device.

Figure 10:
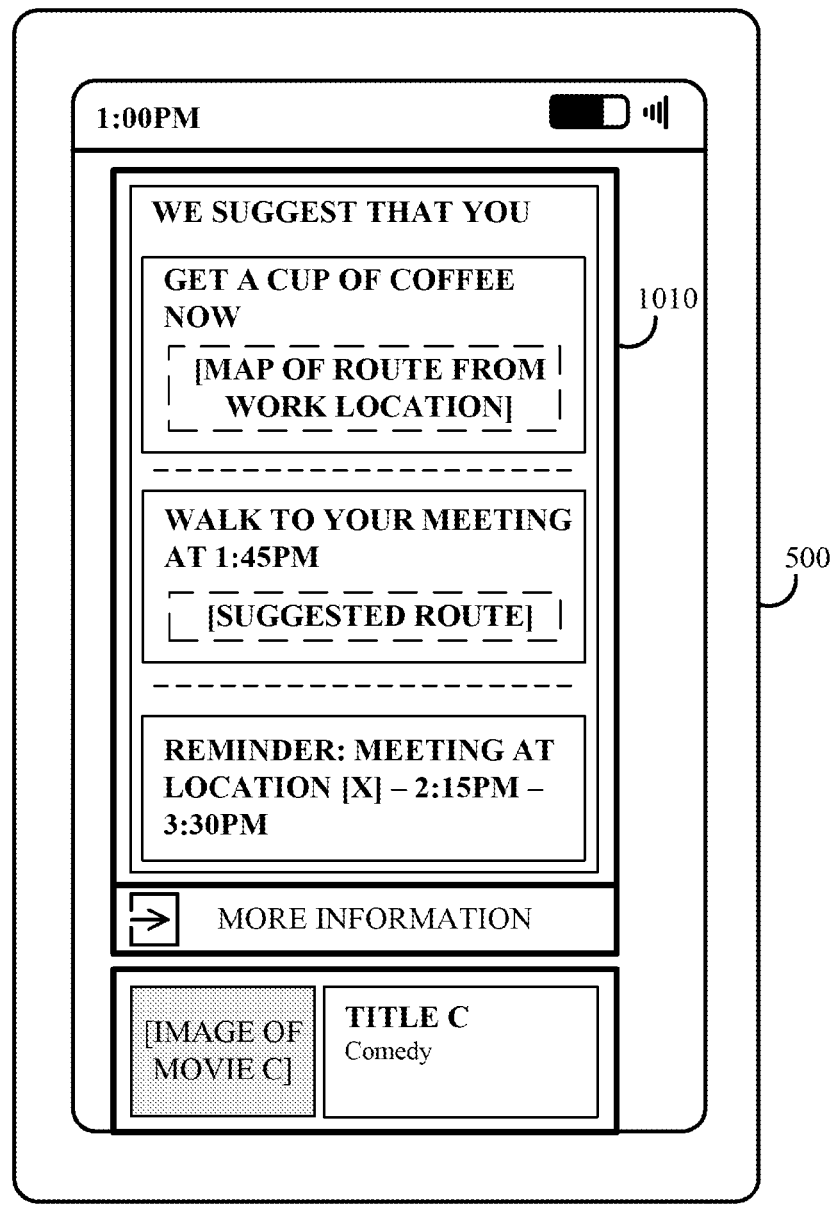
FIG. 10 shows an illustrative example of a user interface for presenting the user with a recommendation interface that includes a recommended action in accordance with some implementations of the disclosed subject matter.

As shown in FIG. 10 and in connection with the above-mentioned example, the recommendation system can present the user with a recommendation interface 1010 that includes multiple recommended actions. As shown, each recommended action that is presented in recommendation interface 1010 can include additional information for performing the recommended action, such as a map of a route in response to recommending that the user walk to the location of an event or commerce information in response to recommended that the user purchase a cup of coffee. As also shown, each recommended action can be associated with a particular time, such as purchasing a cup of coffee now or beginning a walk to the event at 1:45 PM. In some implementations, as described above, each recommended action in recommendation interface 1010 can be triggered by the occurrence of a particular event, such as a determination that the user device is associated with a particular location, a determination that the user device indicates the user is walking along a particular route, etc.

It should be noted that, in some implementations, a recommended action can be executed for multiple users. For example, as described above, the recommendation system can place the user of the user device into a group of users having a similar baseline profile. In addition, the recommendation system can place the user into a group of users based on other suitable criterion, such as others users having an established relationship with the user (e.g., based on social data from a social networking service) or others users that have a similar location profile as the user (e.g., family members, work colleagues, friends, etc.).

In this example, the recommendation system can identify one or more common actions within the group of users. The recommendation system can then select one or more of the actions that are to be executed for the group of users. In a more particular example, the recommendation system can select one or more common actions that are associated with a predetermined number of users (e.g., a majority of the users, a certain percentage of users in the group, etc.) and select one or more common actions that may affect the aggregated emotional state of the group of users. In another more particular example, the recommendation system can rank the common actions based on any suitable criterion and can then select a predetermined number of actions (e.g., top five) and designate them as group actions. In particular, the common actions can be ranked based on a deviation between a current profile associated with the user and a target profile so that the recommendation system can determine which actions have a higher likelihood of affecting the aggregated emotional state of the group of users. For example, a high rank can be assigned to a common action that is associated with a greater deviation between a current profile and a target profile.

For example, the recommendation system can determine an aggregated emotional state for a group of users and can then determine that the group of users or a threshold number of users within the group are located within the proximity of particular output devices. This can include determining that the location information associated with the users in the group of users is within a particular proximity and determining the output devices that are connected to or nearby the user devices associated with each of the co-located users. In a more particular example, the group actions can include any suitable actions that can be executed, such as presenting suitable media content (e.g., a playlist of music that may affect the aggregated emotional state of the group of users), adjusting ambient light in the surroundings of the group of users, adjusting ambient noises and scents in the surroundings of the group of users, etc.

Figure 11:
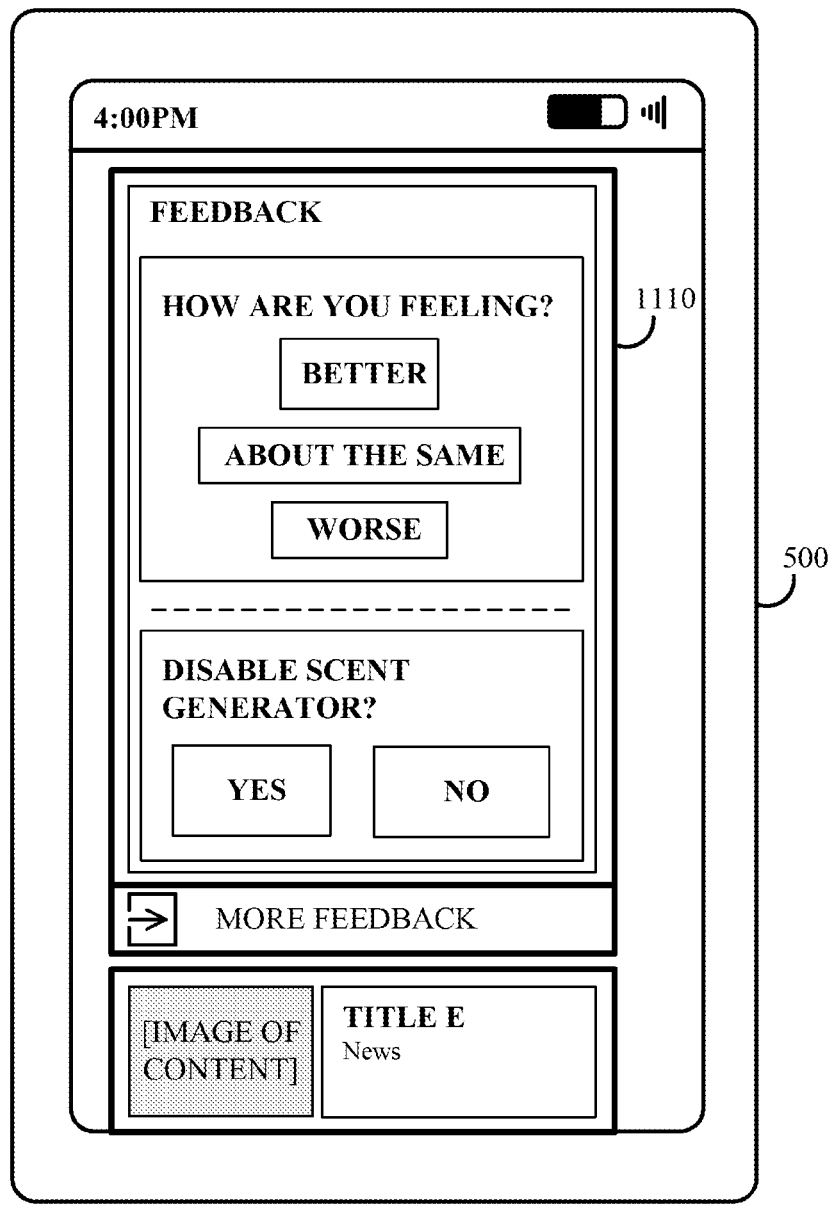
FIG. 11 shows an illustrative example of a user interface that prompts the user to provide feedback relating to an executed action in accordance with some implementations of the disclosed subject matter.

Upon determining that the recommended action has been executed (e.g., the device presented a recommended action that included consuming content or performing a particular activity), the recommendation system can prompt the user of the user device to provide feedback to the recommendation system. For example, the recommendation system can receive feedback from the user indicating whether the recommended action was performed by the user, whether the recommended action may have impacted the emotional state of the user, and/or whether the action is to be recommended again to the user. As shown in FIG. 11, the recommendation system can present an interface 1110 that prompts the user to provide feedback, such as an indication of the change in emotional state, an option to disable an output device, an indication as to whether the user performed a recommended action (e.g., confirming that the user walked to a meeting and visited a coffee shop along the way).

Additionally or alternatively, the recommendation system can obtain updated data, predict the current emotional state of the user and/or generate an updated profile, and determine whether the recommended action or actions may have moved the user towards one or more objectives.

In a more particular implementation, the recommendation system can determine whether a particular recommended action may have moved the user towards one or more objectives and/or goals. For example, the recommendation system can prompt the user to provide feedback (e.g., "How are you feeling now after getting a cup of coffee and watching that video?") in interface 1110 of FIG. 11. In such an example, the recommendation system can receive feedback from the user relating to the particular recommended action. In another example, the recommendation system can select particular portions of data from multiple data streams and determine whether the data indicates that the recommended action may have moved the user towards one or more objectives. In such an example, in response to receiving authorization from a user of a user device to receive data relating to the user from multiple data sources, the recommendation system can select data from times subsequent to providing the recommended action and can determine that the social data and contextual data indicates the recommended action may have moved the user towards one or more objectives (e.g., the data indicates that the user is on track to attain a particular activity level).

In some implementations, any suitable rating can be associated with a recommended action. For example, such a rating can include a confidence value as to how much the recommendation system believes the recommended action may move the user towards one or more objectives. In this example, the recommendation system can begin with an initial confidence value that is incremented or decremented based on feedback from one or more users, where the rating can be increased in response to determining that a particular user has moved towards an objective after providing the recommended action. This increased rating can, for example, cause the recommended action to be provided to other users, such as users having the same or similar objectives, users placed in the same or similar groups as the user, etc. It should be noted that the rating can also include additional information, such as a difficulty value, a timeliness value, etc.

In accordance with various implementations, mechanisms for presenting contextually relevant information are provided. In some implementations, the mechanisms for presenting contextually relevant information can determine that a user is likely to be interested in viewing one or more documents based on information related to the user from one or more data sources (e.g., data sources 110). In some implementations, such documents can include a web page, a word processing document, a slide show presentation, one or more images, a PDF file, an email, etc.

In some implementations, the mechanisms for presenting contextually relevant information can anticipate and identify which documents are likely to be relevant to the user at any given time. Additionally, in some implementations, the mechanisms for presenting contextually relevant information can cause the identified relevant documents to be presented to the user such that the user can more easily access the information included in the documents.

Figure 12:
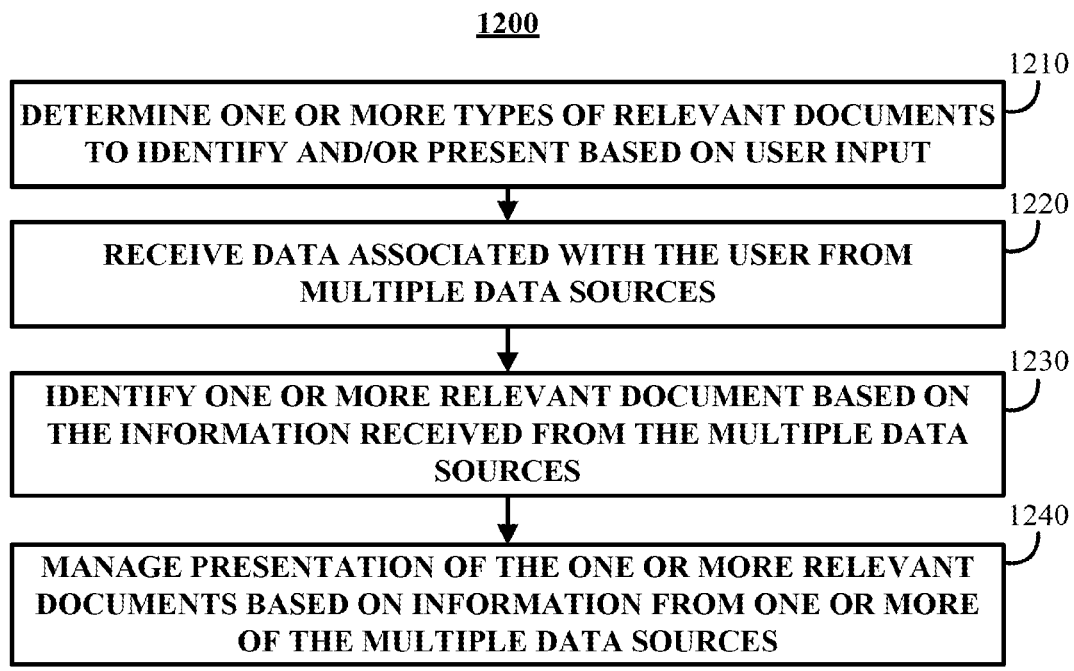
FIG. 12 shows an example of a process for presenting contextually relevant information to a user based on information from multiple data sources in accordance with some implementations of the disclosed subject matter.

FIG. 12 shows an example 1200 of a process for presenting contextually relevant information to a user based on information from multiple data sources in accordance with some implementations of the disclosed subject matter. As shown in FIG. 12, at 1210, process 1200 can determine one or more bases on which relevant documents are to be identified and/or presented based on user input, and when those relevant documents are to be identified and/or presented based on the user input. For example, process 1200 can determine that documents that are relevant to a particular task (e.g., a meeting, a project, etc.) are to be identified and presented when a user is engaged in that task (and/or is scheduled to be engaged in that task). As another example, process 1200 can determine that one or more documents that are related to a document that is currently being presented are to be identified and/or presented as relevant documents. As yet another example, process 1200 can determine that documents that are related to a particular task, activity and/or common subject matter are to be identified and/or presented as documents relevant to that task, activity and/or subject matter. As still another example, process 1200 can determine that one or more documents that was being presented just prior to a currently presented document is to be identified and/or presented as a relevant document.

At 1220, process 1200 can receive data associated with the user from multiple data sources. In some implementations, the multiple data sources can include any suitable sources of data, such as sources related to communications by the user, sources related to schedule and/or calendar information of the user, and/or any other suitable sources, such as sources described above in connection with 110 of FIGS. 1 and/or 430 of FIG. 4. In some implementations, a user can be provided with an opportunity to select which data sources can be used to determine that one or more documents are contextually relevant documents. For example, as described above in connection with FIG. 6, a computing device associated with the user can present a user interface that prompts the user to select and/or de-select data sources that are to be used to identify relevant documents.

At 1230, process 1200 can identify one or more relevant documents based on the information received from the multiple data sources. In some implementations, process 1200 can determine which data sources from among available data sources to use and can determine portions of the information from those data sources that are to be used based on the one or more bases on which relevant documents are to be identified. For example, if process 1200 is to identify documents that are relevant to a task that the user is scheduled to perform, process 1200 can determine that information is to be used from communications data and schedule data associated with the user. In some implementations, process 1200 can select data from only a single data source in order to identify one or more relevant documents.

In some implementations, process 1200 can use any suitable technique or combination of techniques to identify one or more relevant documents based on the information from the multiple data sources. For example, as described below in connection with FIG. 13, process 1200 (and/or any other suitable process) can identify relevant documents based on information from one or more communications data sources (e.g., email messaging, SMS messaging, messaging applications, etc.) that indicates that documents were the subject of and/or were attached to one or more communications. As another example, as described below in connection with FIG. 14, process 1200 (and/or any other suitable process) can identify relevant documents based on information from one or more communications data sources and/or from scheduling information (e.g., calendar information) that indicates that the documents are associated with a particular task and/or activity. As yet another example, as described below in connection with FIG. 15, process 1200 (and/or any other suitable process) can identify relevant documents based on information from a web browser application (and/or any other suitable application for presenting documents) that indicates which documents are currently available for viewing (e.g., loaded in a tab of a browser window and/or in a browser window) and group the available documents based on common subject matter of the documents, a common task that documents are associated with, and/or a common activity that documents are associated with. As still another example, as described below in connection with FIG. 16, process 1200 (and/or any other suitable process) can identify one or more relevant documents based on information from a web browser application (and/or any other suitable application for presenting documents) that indicates that a new browser tab and/or a new browser window has been opened.

As a further example, process 1200 (and/or any other suitable process) can identify relevant documents based on the author and/or sender of a document being the same as the author and/or sender of a recently viewed document or documents. In such an example, the identified document can be a document that the user has not yet viewed, a new document, a document that the user has already reviewed but that also has similar subject matter (determined using any suitable technique or combination of techniques), a document having any other suitable properties, or a document having any suitable combination of these and/or any other properties. As another further example, process 1200 (and/or any other suitable process) can identify relevant documents based on a document being the same type of document as another document or documents that a user has recently viewed. In such an example, the type of document can be determined based on a subject line of the document and/or of a message with which the document is associated (e.g., as an attachment to an email), based on the title of the document, based on text or other descriptive material in a message to which the document was attached, based on a structure of the document, and/or based on any other properties related to the document that can be used to indicate a type for the document. In a more particular example, if a user has just viewed a purchase order document, process 1200 can identify other purchase order documents that may be relevant (e.g., from the same source, received within a particular period of time, unviewed, not marked as done, the user has not replied to the message associated with the document, etc.). As yet another further example, process 1200 can use any suitable combination of one or more techniques to identify relevant documents with the results weighted based on user preferences, user behavior and/or based on any other suitable factor or combination of factors. In a more particular example, if a user has recently viewed multiple documents that are of the same type and has responded to messages associated with those documents, process 1200 can identify one or more documents at 1230 by identifying other documents of the same type, where a likelihood that the document is of the same type can be used with a weight associated determines based on a confidence that the user is likely to be interested in viewing other documents of the same type (e.g., as opposed to being interested in information related to the subject of the document and/or sender of the document instead of other documents of the same type). Such a confidence can be determined based on any suitable information, such as scheduling and/or calendar information, messaging information, etc. This weighted information related to document type can be combined with weighted information generated based on process 1200 identifying documents based on scheduling information (e.g., as described below in connection with FIG. 14). In such an example, process 1200 can manage presentation of the documents (e.g., as described below in connection with 1240) based on combined weighting information for each document and selecting a subset of documents (up to and including all documents) that are most relevant based on the combined weighted information.

At 1240, process 1200 can manage presentation of the one or more relevant documents identified at 1230 based on information from one or more of the multiple data sources and/or based on the basis on which the document was identified as being relevant. For example, process 1200 can cause the one or more identified relevant documents to be presented in response to a user powering on, unlocking and/or otherwise waking up a user device associated with the user within a threshold time of the user participating in a conversation (e.g., by email, by SMS, by using a messaging application, etc.) in which the documents were discussed and/or attached. As another example, process 1200 can cause the one or more identified relevant documents to be presented in response to a current time approaching a time at which a task and/or activity associated with the relevant documents is scheduled to begin. As yet another example, process 1200 can group together documents that are all relevant to the same task, activity and/or subject matter for easier viewing of those documents when a user is engaged in the task and/or activity, and/or interested in viewing documents related to the common subject matter. As still another example, process 1200 can present, on a second display, a document that was being presented on a first display when a new document was opened and presented on the first display.

Figure 13:
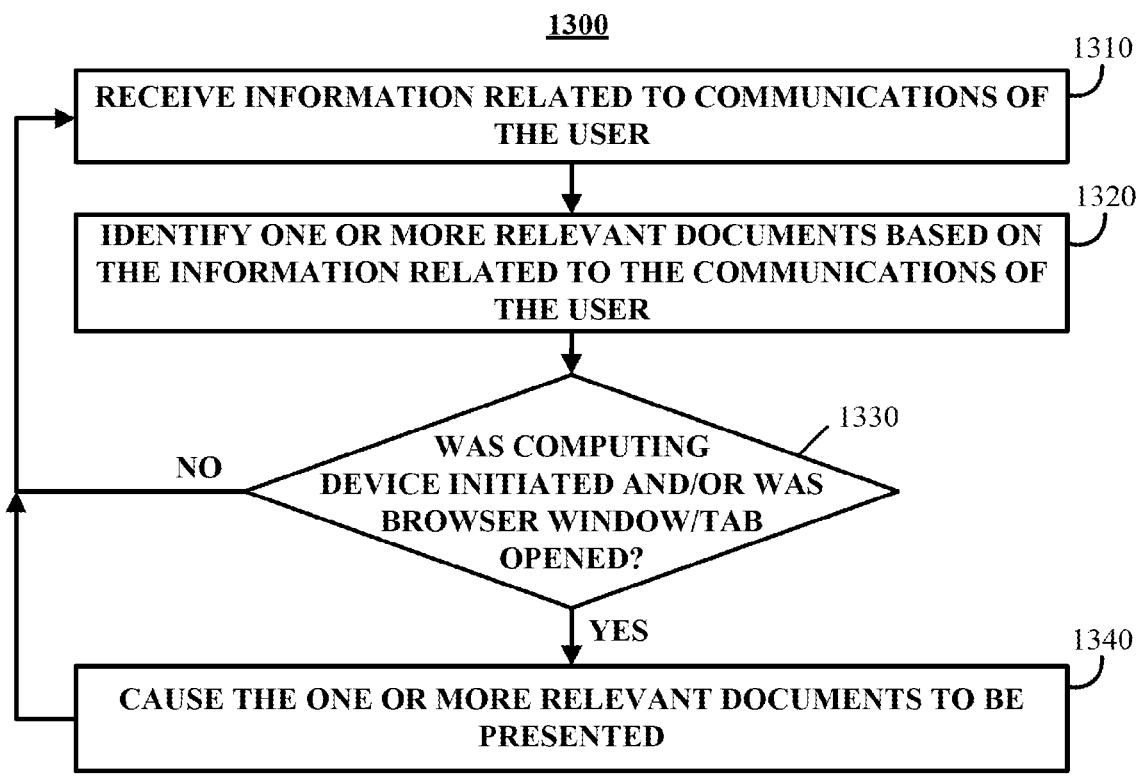
FIG. 13 shows an example of a process for presenting documents relevant to communications sent and/or viewed using a computing device associated with the user when the computing device or another computing device associated with the same user is powered on, unlocked, opened, woken from a sleep mode, initiated, etc., and/or when a new browser window, and/or a new browser tab are opened in accordance with some implementations of the disclosed subject matter.

FIG. 13 shows an example 1300 of a process for presenting documents relevant to communications sent and/or viewed using a user device associated with the user (e.g., a user of user device 102) when the user device or another user device associated with the same user is powered on, unlocked, opened, woken from a sleep mode, initiated, etc., and/or when a new browser window, and/or a new browser tab are opened in accordance with some implementations of the disclosed subject matter. At 1310, process 1300 can receive information related to communications of the user. As described above, for example in connection with 430 of FIG. 4, process 1300 can receive the information related to the communications of the user subject to one or more restrictions set by the user. These restrictions can limit which sources of information related to the communication of the user are available for use by process 1300 and/or what types of information related to communications from a particular source are available for use by process 1300. In some implementations, process 1300 can use information from any suitable communication source (e.g., email, SMS messages, messages sent and/or received using a messaging application, etc.) and/or can use any suitable data from those sources (e.g., metadata for messages sent and/or received, identifying information of documents attached to the communications, etc.).

At 1320, process 1300 can identify one or more relevant documents based on the information related to the communications of the user. Process 1300 can use any suitable technique or combination of techniques to identify the one or more relevant documents. For example, process 1300 can analyze the information related to communications of the user to determine whether the user has recently participated in a thread (e.g., a series of one or more messages exchanged between the user and one or more other users) associated with one or more documents. In a more particular example, process 1300 can use the information received related to the communications of the user to identify documents that were attached to the communications (e.g., by being attached to an email, by being linked in the body of the communication, etc.). In another example, process 1300 can identify all documents associated with threads in which the user has participated within a threshold period of time prior to a current time (e.g., within the last minute, two minutes, five minutes, etc.). In yet another example, process 1300 can identify documents associated with a thread in which the user participated in with at least one other user with whom the user is currently communicating (e.g., viewing an email from the other user, composing an email to the other user, using a messaging application to communicate with the other user, using a telephone function of the user device to connect to a contact identified as the other user, etc.). At least a portion of these documents can be identified as relevant documents.

In some implementations, process 1300 can identify multiple relevant documents and use any suitable technique or combination or techniques to determine which amongst the identified relevant documents may be relatively more relevant to a user at a particular time. For example, process 1300 (and/or any other suitable process) can determine which of the identified relevant documents are relatively more relevant based on timing data of when the document (or a version of the document) was last attached and/or mentioned in a thread. As another example, process 1300 (and/or any other suitable process) can determine whether a particular document is relatively more relevant based on whether the document (or a version of the document) was attached and/or mentioned in multiple threads. As yet another example, process 1300 (and/or any other suitable process) can determine whether a particular document is relatively more relevant based on whether any other documents were attached and/or mentioned after a particular document (or a version of the document) for which relevance is being determined was attached or mentioned in a thread, and/or how many other documents were attached and/or mentioned in the thread after the particular document was attached and/or mentioned in the thread. As still another example, process 1300 (and/or any other suitable process) can determine whether a particular document is relatively more relevant by determining whether the document is related to other documents that were identified as relevant documents.

At 1330, process 1300 can determine whether a user device associated with the user was initiated and/or whether a new browser window and/or browser tab has been opened. For example, process 1300 can determine whether a user device such as a laptop computer is powered on, woken from a sleep mode, opened and/or unlocked. As another example, process 1300 can determine whether a user device such as a smartphone or tablet computer is powered on, woken from a sleep mode and/or unlocked. As yet another example, process 1300 can determine whether a browser application being executed by a user device has opened a new browser window and/or a new browser tab (e.g., within an existing browser window). In some implementations, upon determining that a user device has been initiated, process 1300 (and/or any other suitable process) can automatically (e.g., without input from the user to do so) launch a browser application and/or open a new browser window and/or browser tab.

If a user device associated with the user has not been initiated and if a new browser window or new browser tab has not been opened ("NO" at 1330), process 1300 can return to 1310 and continue to receive information related to communications of the user.

Otherwise, if a user device associated with the user has been initiated and/or if a new browser window and/or new browser tab has been opened ("YES" at 1330), process 1300 can proceed to 1340.

At 1340, process 1300 can cause the one or more relevant documents identified at 1340 to be presented to the user. Process 1300 can use any suitable technique or combination of techniques to cause the identified documents to be presented. For example, in cases where the user device has been initiated, but a browser has not been opened, process 1300 can cause a browser application installed on the user device to be launched. In such an example, process 1300 can cause the browser to navigate to an address associated with identified relevant documents. Additionally, process 1300 can cause different documents to be presented in separate tabs. As another example, in cases where a new browser window and/or browser tab has been opened by a browser application that is already being executed, process 1300 can cause the browser to navigate to an address associated with any identified documents and present at least one of the documents using the new browser window and/or tab.

In some implementations, process 1300 can cause a subset of the documents identified as relevant documents at 1320 to be presented at 1340. For example, as described above in connection with 1320, process 1300 can identify which among relevant documents are relatively more relevant and can cause one or more of the most relevant documents to be presented.

In some implementations, process 1300 can cause one or more relevant documents to be presented as links to the document (e.g., in a home page or start page of a browser window and/or browser tab), thumbnails representing the documents, and/or as any other suitable representation of the document rather than presenting a full-sized version of the document. Note that although documents are generally described herein as being presented by a browser application, such a document can be a web page that is available on a network such as the internet, but can also be a document (e.g., a word processing document, a slideshow document, a PDF document, etc.) other than a web page which can be available locally and/or remotely.

Figure 14:
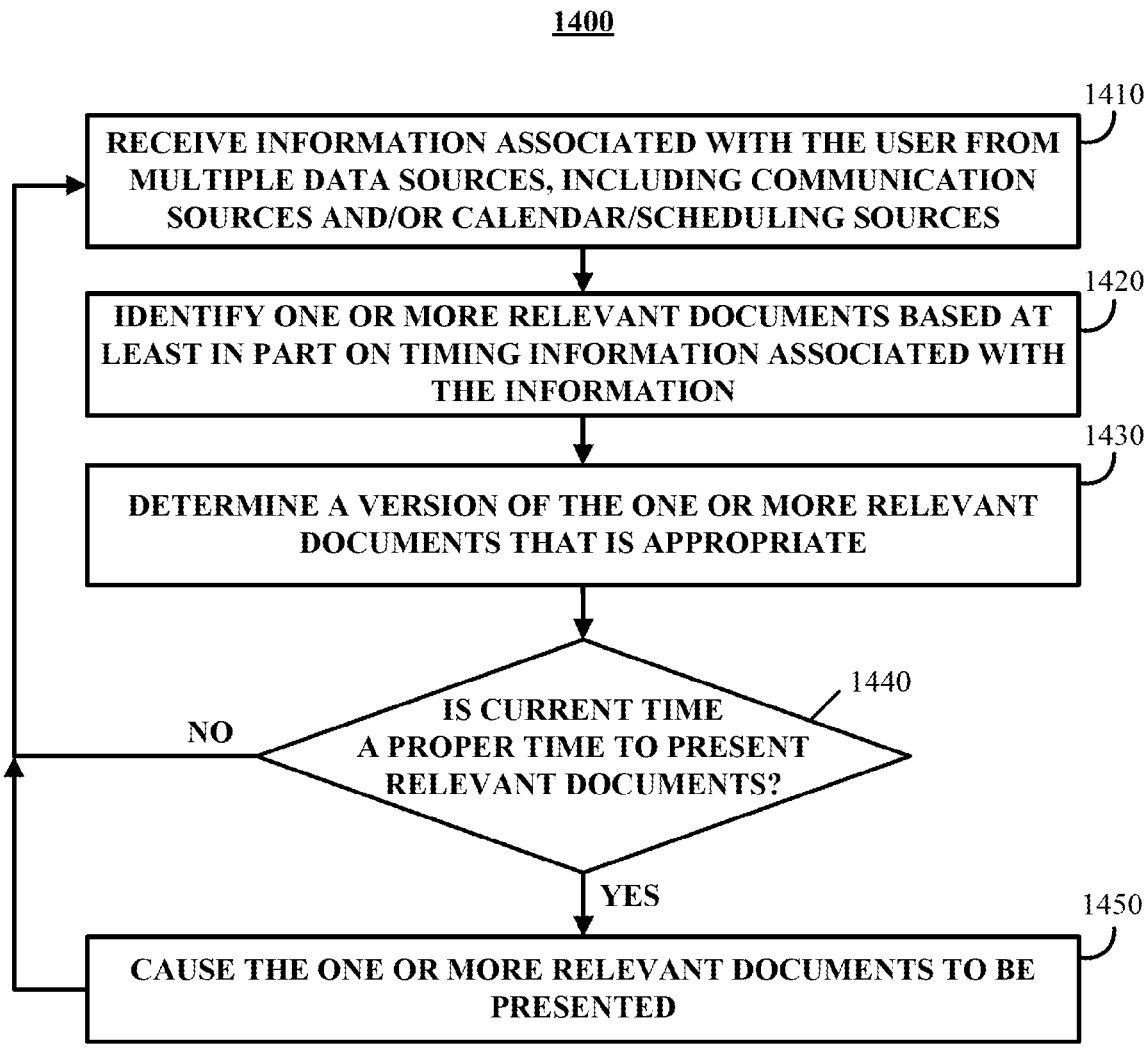
FIG. 14 shows an example of a process for presenting documents relevant to a scheduled task associated with the user at a time associated with the task in accordance with some implementations of the disclosed subject matter.

FIG. 14 shows an example 1400 of a process for presenting documents relevant to a scheduled task associated with the user (e.g., a user of user device 102) at a time associated with the task in accordance with some implementations of the disclosed subject matter. At 1410, process 1400 can receive information related to communications of the user and/or related to calendar/scheduling information of the user. As described above, for example in connection with 430 of FIG. 4, process 1400 can receive the information related to the communications of the user and/or calendar/schedule information of the user subject to one or more restrictions set by the user. These restrictions can limit which sources of information are available for use by process 1400 and/or what types of information are available for use by process 1400. In some implementations, process 1400 can use information from any suitable communication source (e.g., email, SMS messages, messages sent and/or received using a messaging application, etc.) and/or calendar/scheduling information source, and/or can use any suitable data from those sources (e.g., metadata for messages sent and/or received, identifying information of documents attached to the communications, etc.).

At 1420, process 1400 can identify one or more relevant documents based at least in part on timing information associated with the information related to communications of the user and/or calendar/scheduling information. Process 1400 can use any suitable technique or combination of techniques to identify the one or more relevant documents. For example, process 1400 can analyze the information related to communications of the user and the calendar/scheduling information to determine whether a user is associated with an upcoming event and/or task such as a meeting, a conference call, an assigned project that the user is to be working on, etc. In a more particular example, process 1400 can use the information received related to the communications of the user and calendar/scheduling information to identify documents that were attached to communications associated with a particular event and/or task, and/or documents that are identified in a user's calendar/schedule information as being relevant to a particular event and/or task. In another example, process 1400 can identify documents that are associated with a particular task and/or event with which the user has been associated, and process 1400 can determine that these tasks may be relevant to future occurrences of the same event and/or occurrences of similar events that are related to that event (e.g., a series of meetings about the same project, a weekly status meeting, etc.). In yet another example, process 1400 can identify documents that a user has previously opened in association with a similar task and/or event associated with a similar group of participants (including just the user), associated with similar subject matter, etc. In some implementations, at least a portion of the documents identified by process 1400 can be identified as relevant documents.

In some implementations, process 1400 can identify multiple relevant documents and use any suitable technique or combination of techniques to determine which amongst the identified relevant documents may be relatively more relevant to a user at a particular time and/or in association with a particular task and/or event. For example, process 1400 (and/or any other suitable process) can determine which of the identified relevant documents are relatively more relevant to a particular task based on how similar the subject matter of the document is to other documents associated with the task (e.g., other documents opened by the user, other documents explicitly associated with the task by the user, etc.). As another example, process 1400 (and/or any other suitable process) can determine whether a particular document is relatively more relevant based on whether the document (or a version of the document) was attached and/or mentioned in one or more threads related to a particular task and/or event.

At 1430, process 1400 can determine, for documents that are available in multiple versions (e.g., based on there being revisions to the document, updates to the document, etc.), a version of the one or more relevant documents that is appropriate for presentation to the user in association with a particular task and/or event. Process 1400 can use any suitable technique or combination of techniques to determine which of multiple versions of a document is the appropriate version of a document to present. For example, process 1400 can determine that a most recent version of the document is the appropriate document to present to the user. As another example, process 1400 can determine that a version of the document that was most recently shared between the user and another user that is associated with the task and/or activity is the appropriate version of the document to present to the user. As yet another example, process 1400 can cause one version of the document (e.g., a version that is determined to be most appropriate) to be presented more prominently, and cause one or more other versions of the document to be made available for presentation and/or to be presented less prominently.

At 1440, process 1400 can determine whether a current time is a proper time to present one or more relevant documents identified at 1420. Process 1400 can determine whether a current time is a proper time using any suitable technique or combination of techniques. For example, process 1400 can determine whether a current time is within a threshold time of a scheduled task and/or event (e.g., five minutes or less from a scheduled start time of a task and/or event, between a scheduled start time of a task and/or event and a scheduled end time of the task and/or event, etc.).

If the current time is not a proper time to present one or more relevant documents ("NO" at 1440), process 1400 can return to 1410 and continue to receive information associated with the user.

Otherwise, if the current time is a proper time to present one or more relevant documents ("YES" at 1440), process 1400 can proceed to 1450. At 1450, process 1400 can cause one or more relevant documents associated with a task and/or event that the user is currently scheduled to perform (and/or that the user will be scheduled to perform in the near future) to be presented. In some implementations, process 1400 can use any suitable technique or combination of techniques to cause the relevant documents to be presented. For example, process 1400 can use techniques described above in connection with 1240 of FIGS. 12 and/or 1340 of FIG. 13. As another example, process 1400 can use techniques described below in connection with FIGS. 15 and/or 16.

Figure 15:
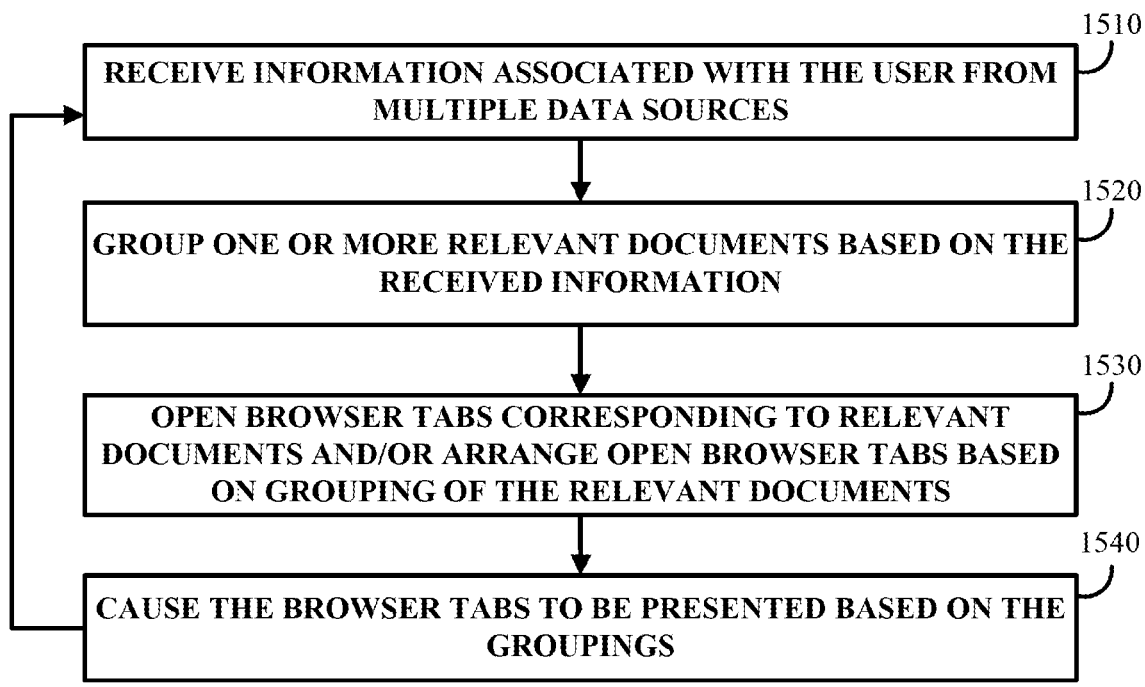
FIG. 15 shows an example of a process for grouping documents based on information from multiple data sources in accordance with some implementations of the disclosed subject matter.

FIG. 15 shows an example 1500 of a process for grouping documents based on information from multiple data sources in accordance with some implementations of the disclosed subject matter. At 1510, process 1500 can receive information associated with the user from multiple data sources. As described above, for example in connection with 430 of FIG. 4, process 1500 can receive the information related to any suitable data source associated with the user subject to one or more restrictions set by the user. These restrictions can limit which sources of information are available for use by process 1500 and/or what types of information are available for use by process 1500. In some implementations, process 1500 can use information from any suitable data source (e.g., email, SMS messages, messages sent and/or received using a messaging application, a browser application, a web search service, a user profile, etc.) and/or can use any suitable data from those sources (e.g., metadata associated with the sources of data, identifying information of documents attached to communications, data that is representative of the preferences of a group of users that is similar to the user, etc.).

At 1520, process 1500 can group one or more relevant documents based on the received information. In some implementations, process 1500 can use any suitable technique or combination of techniques to group the one or more relevant documents based on the received information. In some implementations, the relevant documents grouped by process 1500 can be documents that are currently open and/or being presented (e.g., by a browser application, by a word processing application, by one or more other applications, etc.). Additionally or alternatively, the relevant documents grouped by process 1500 can be documents that may or may not be open and that are identified using any suitable process (e.g., the processes described above in connection with FIGS. 13 and 14).

In some implementations, process 1500 can group the one or more documents based on information related to communications of the user such that documents related to a task, event and/or conversation/thread are grouped.

In some implementations, process 1500 can group one or more documents based on metadata of the documents and/or information from a service that characterizes documents (e.g., a web search service) indicating that the documents are related. For example, multiple documents from the same web page can be grouped. As another example, multiple documents that are related to similar subject matter can be grouped (e.g., documents that are related to news and/or current events can be grouped, documents that are related to video games can be grouped, documents that are related to humor can be grouped, etc.). As another example, multiple documents that have a similar structure can be grouped (e.g., web pages that include a single video can be grouped, web pages that include a blog can be grouped, etc.). In some implementations, the same document can be placed into multiple groups. For example, a document that includes a humorous video can be grouped with other documents that include a video, and can be grouped with other documents that include humorous subject matter.

At 1530, process 1500 can open one or more browser windows and/or browser tabs corresponding to relevant documents and/or relevant groups of documents and/or can arrange open browser tabs based on the grouping of the relevant documents. For example, process 1500 can arrange browser tabs such that grouped tabs are presented near or adjacent to each other.

At 1540, process 1500 can cause the browser tabs to be presented based on the groupings. For example, process 1500 can group one or more documents and present a tab corresponding to the group of one or more documents. Such a tab can be labeled with a semantically meaningful term that identifies what the documents associated with the tab are relevant to. In such an example, when a particular tab corresponding to a group of documents is selected, tabs corresponding to each document can be presented, and presentation of documents related to other tabs corresponding to groups of documents can be inhibited with only the tab's semantically meaningful label shown.

Figure 16:
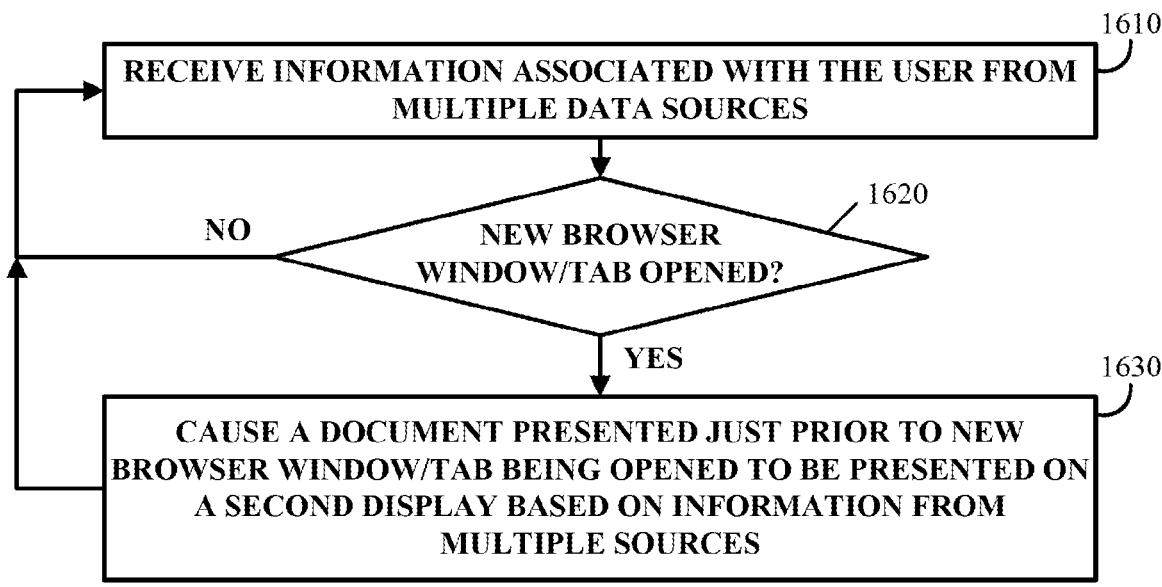
FIG. 16 shows an example of a process for presenting a relevant document on a second display in accordance with some implementations of the disclosed subject matter.

FIG. 16 shows an example 1600 of a process for presenting a relevant document on a second display in accordance with some implementations of the disclosed subject matter. As shown in FIG. 16, at 1610, process 1600 can receive information associated with the user from multiple data sources. As described above, for example in connection with 430 of FIG. 4, process 1600 can receive the information associated with the user subject to one or more restrictions set by the user. These restrictions can limit which sources of information are available for use by process 1600 and/or what types of information are available for use by process 1600. In some implementations, process 1600 can use information from any suitable source and/or can use any suitable data from those sources (e.g., metadata, identifying information of documents presented by an application, devices associated with the user, etc.).

For example, process 1600 can receive information related to a browser application of a user. In such an example, process 1600 can receive information indicating that a new browser window and/or a new browser tab has been opened. Process 1600 can also receive information indicating that one or more documents are being presented by the browser application and/or which of these documents (if any) is currently being presented to a user.

As another example, process 1600 can receive information indicating that a user device that is being used to present a document on a first display is capable of causing the document to be presented on a second display. In such an example, a second display can be a display coupled to the user device, such as a personal computer or a laptop computer that is coupled to multiple display devices (e.g., having two or more monitors). Additionally or alternatively, a second display can be a display device (such as a television) that the user device can cause to present content, such as through an application being executed by the display device and/or through a media presentation device (e.g., a media player, a set-top box, etc.) operatively coupled to the display device that the user device can communicate with to cause content to be presented.

At 1620, process 1600 can determine whether a new browser window and/or browser tab has been opened. For example, process 1600 can receive information from the browser application that a new browser window and/or a new browser tab has been opened. In some implementations, process 1600 can receive information specifying that a new browser window and/or a new browser tab has been opened to present a document that is related to a document presented just prior to the new browser window and/or browser tab being opened. For example, process 1600 can receive information from the browser application indicating that the user opened a new tab to load a document that was linked in a currently presented browser tab and/or browser window.

Additionally, in some implementations, process 1600 can determine that a new browser tab and/or new browser window has been opened only when a document presented in a new browser window and/or new browser tab is related to a document presented just prior to the new browser window and/or browser tab being opened, and/or satisfies another criteria (e.g., the new tab includes a web page for a web search service and/or search results from such a service, the new tab includes information about a term or phrase that a user selected in the currently presented document, etc.)

If process 1600 determines that a new browser window has not been opened ("NO" at 1620), process 1600 can return to 1610 and continue to receive information associated with the user from multiple data sources. Otherwise, if process 1600 determines that a new browser window has been opened ("YES" at 1620), process 1600 can proceed to 1630.

At 1630, process 1600 can cause a currently presented document to be presented on a second display based on the information from multiple data sources. For example, process 1600 can determine that a second display is available to present the currently presented document. As another example, process 1600 can determine instructions that are to be used to cause the currently presented document to be presented on the second display. In such an example, process 1600 can determine whether the user should be queried as to whether to present the currently presented document (e.g., to prevent a television that is presenting a program that the user is watching from being switched to presenting the currently presented document without the user's permission). In some implementations, when the newly opened browser window and/or browser tab is closed, the document that is presented using the second display can be inhibited from presentation on the second display, and can instead be presented on the first display once again.

In some implementations, process 1600 can use any suitable technique or combination of techniques to cause the currently presented document to be presented on the second display. For example, in cases where the second display is a second monitor coupled to a user device, process 1600 can determine that the first display is being used to present the newly opened browser tab and/or newly opened browser window, and can cause a browser window displaying the currently presented document to be presented by the second display. As another example, in cases where the second display is associated with (and/or is incorporated as part of) a media presentation device (e.g., a television, a media streaming device, a game console, etc.) that the user device can cause to present content (e.g., through an application being executed by a television, through a device operatively coupled to an input of a television, etc.), process 1600 can determine one or more instructions that are to be sent to cause the media presentation device to present the document that was being presented just prior to the new browser window and/or browser tab being presented. In such an example, process 1600 can determine that an address for the document is to send to the media presentation device with an instruction to present the document at the address. In some implementations, process 1600 can determine that the user device is located in relatively close proximity to the second display using any suitable techniques, such as determining that the user device is on the same local network as the media presentation device, by determining that the user device can connect to the media presentation device using short range communication techniques (e.g., Bluetooth), by determining that a sound emitted by the media presentation device can be sensed by the user device, and/or using any other suitable technique or combination of techniques.

In some implementations, portions of one or more of the processes described above in connection with FIGS. 12-16 can be executed by any suitable user device. For example, one or more portions of the processes of FIGS. 12-16 can be performed by a server, such as server 120. In such an example, server 120 can receive the information from the one or more data sources and use this information to identify relevant documents, and can cause relevant documents to be presented by a user device 102. As another example, one or more portions of processes of FIGS. 12-16 can be performed by a user device, such as user device 102. In such an example, user device 102 can receive the information from the one or more data sources and use this information to identify relevant documents, and can present documents and/or cause the documents to be presented by another user device 102. In some implementations, which portions are executed by server 120 and which portions are executed by user device 102 can be determined based on the amount of computation that is required to execute those portions, based on user preferences, and/or on any other suitable basis or bases.

Accordingly, methods, systems, and media for presenting contextually relevant information are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method comprising:
   receiving information from a browser application;
   identifying a set of open browser tabs representing documents reflecting a common relationship based on the information, the common relationship including at least one of a common activity, a common task, common structure, or common subject matter; and
   in response to identifying the set:
      generating a label for the set of open browser tabs reflecting the common relationship, and
      presenting the documents as a group by arranging the tabs of the set to be adjacent to each other, and presenting a tab, which corresponds to the group, with the label in the browser application.

2. The method of claim 1, wherein the label is a semantically meaningful term generated based on the information.

3. The method of claim 1, wherein the common relationship is the common task.

4. The method of claim 1, wherein the common relationship is the common subject matter.

5. The method of claim 1, wherein the common relationship is the common activity.

6. The method of claim 1, wherein the common relationship is the common structure.

7. The method of claim 1, wherein at least one of the documents is included in another set of documents presented as a second group.

8. The method of claim 1, wherein presenting the documents as the group with the label includes:

presenting a user interface element of the browser application that corresponds to the group, the user interface element including the label and identifying the documents.

9. A computing device comprising:

at least one processor; and a non-transitory computer-readable medium storing executable instructions that cause the at least one processor to:
- receive information from a browser application;
- identify a set of open browser tabs representing documents reflecting at least one of a common relationship based on the information, the common relationship including a common activity, a common task, common structure, or common subject matter; and
- in response to identifying the set:
  - generate a label for the set of open browser tabs reflecting the common relationship, and
  - present the documents as a group by arranging the tabs of the set to be adjacent to each other, and presenting a tab, which corresponds to the group, with the label in the browser application.

10. The computing device of claim 9, wherein the label is a semantically meaningful term generated based on the information.

11. The computing device of claim 9, wherein the common relationship is the common task.

12. The computing device of claim 9, wherein the common relationship is the common subject matter.

13. The computing device of claim 9, wherein the common relationship is the common activity.

14. The computing device of claim 9, wherein the common relationship is the common structure.

15. The computing device of claim 9, wherein at least one of the documents is included in another set of documents presented as a second group.

16. The computing device of claim 9, wherein presenting the documents as the group with the label includes:
presenting a user interface element of the browser application that corresponds to the group, the user interface element including the label and identifying the documents.

17. A non-transitory computer-readable medium storing executable instructions that when executed by at least one processor cause the at least one processor to execute operations, the operations comprising:
- receiving information from a browser application;
- identifying a set of open browser tabs representing documents reflecting at least one of a common relationship based on the information, the common relationship including a common activity, a common task, common structure, or common subject matter; and
- in response to identifying the set:
  - generating a label for the set of open browser tabs reflecting the common relationship, and
  - presenting the documents as a group by arranging the tabs of the set to be adjacent to each other, and presenting a tab, which corresponds to the group, with the label in the browser application.

18. The non-transitory computer-readable medium of claim 17, wherein the label is a semantically meaningful term generated based on the information.

19. The non-transitory computer-readable medium of claim 17, wherein at least one of the documents is included in another set of documents presented as a second group.

20. The non-transitory computer-readable medium of claim 17, wherein presenting the documents as the group with the label includes:
presenting a user interface element of the browser application that corresponds to the group, the user interface element including the label and identifying the documents.

* * * * *